(12) United States Patent
Monchamp et al.

(10) Patent No.: US 9,174,362 B2
(45) Date of Patent: Nov. 3, 2015

(54) SOLVENT-FREE PLURAL COMPONENT SPRAYING SYSTEM AND METHOD

(75) Inventors: Ryan Winston Monchamp, San Tan Valley, AZ (US); Peter Paul Roosen, Wellington (CA)

(73) Assignee: Castagra Products, Inc., Reno, NV (US)

(*) Notice: Subject to any disclaimer, the term of this patent is extended or adjusted under 35 U.S.C. 154(b) by 621 days.

(21) Appl. No.: 13/181,201

(22) Filed: Jul. 12, 2011

(65) Prior Publication Data
US 2013/0015262 A1 Jan. 17, 2013

(51) Int. Cl.
| | |
|---|---|
| B05B 1/24 | (2006.01) |
| B29B 7/76 | (2006.01) |
| B05B 9/00 | (2006.01) |
| B05B 7/16 | (2006.01) |
| B05B 7/04 | (2006.01) |
| B05B 9/01 | (2006.01) |
| B05B 1/00 | (2006.01) |
| B05B 7/24 | (2006.01) |
| B05C 5/00 | (2006.01) |

(Continued)

(52) U.S. Cl.
CPC . B29B 7/761 (2013.01); B05B 1/00 (2013.01); B05B 7/0466 (2013.01); B05B 7/16 (2013.01); B05B 7/2472 (2013.01); B05B 9/002 (2013.01); B05B 9/01 (2013.01); B05C 5/001 (2013.01); B29B 7/7605 (2013.01); B29B 7/7615 (2013.01); B29B 7/805 (2013.01); B67D 3/0022 (2013.01)

(58) Field of Classification Search
CPC ............ B05B 1/00; B05B 9/002; B05B 7/16; B05B 7/2472; B05B 7/0466; B05B 9/01; B29B 7/761; B29B 7/7605; B29B 7/7615; B29B 7/805; B05C 5/001; B67D 3/0022
USPC ............... 239/1, 13, 128, 135, 303, 432–434, 239/525; 222/145.6, 146.1
See application file for complete search history.

(56) References Cited

U.S. PATENT DOCUMENTS

| | | | |
|---|---|---|---|
| 1,261,712 | A | 4/1918 | Crispell |
| 3,122,326 | A | 2/1964 | Cook |
| 3,176,922 | A | 4/1965 | Decker |

(Continued)

FOREIGN PATENT DOCUMENTS

| | | |
|---|---|---|
| FR | 1 570 588 | 6/1969 |
| WO | 2009/036129 A1 | 3/2009 |

OTHER PUBLICATIONS

Fusion™ Solvent Purge Plural-Component Gun, Jul. 2011, Graco Minnesota.

*Primary Examiner* — Steven J Ganey
(74) *Attorney, Agent, or Firm* — Jason D. Voight

(57) ABSTRACT

Solvent-free spraying system including methods and apparatus for spraying plural component materials without requiring the use of solvents to flush out equipment or as part of the materials being dispensed. Materials sprayed can have simultaneously widely varying viscosities, pressures, temperatures and ratios between two or more respective components being combined by the spraying apparatus. Cure rates and gel times can vary widely from hours to less than 10 seconds for mixing and dispensing various plural component thermoplastic and thermosetting materials including foams, moldings and coatings made from urethanes, ureas, epoxies, polyesters, phenolics and other chemical compositions that react rapidly upon mixing of the components thereof.

19 Claims, 15 Drawing Sheets

(51) Int. Cl.
  *B67D 3/00*  (2006.01)
  *B29B 7/80*  (2006.01)

(56) References Cited

U.S. PATENT DOCUMENTS

| | | | |
|---|---|---|---|
| 3,232,540 A | 2/1966 | Cassanmagnago | |
| 3,263,928 A | 8/1966 | Gusmer | |
| 3,291,396 A | 12/1966 | Walter | |
| 3,366,337 A | 1/1968 | Brooks et al. | |
| 3,375,978 A | 4/1968 | Rennie | |
| 3,437,273 A | 4/1969 | Hagfors | |
| 3,504,855 A | 4/1970 | Volker | |
| 3,708,123 A | 1/1973 | Krueger | |
| 3,759,450 A | 9/1973 | Fram et al. | |
| 3,799,403 A | 3/1974 | Probst et al. | |
| 4,267,299 A | 5/1981 | Oechsle, III | |
| 4,325,513 A | 4/1982 | Smith | |
| 4,453,670 A | 6/1984 | Sirovy | |
| 4,583,691 A | 4/1986 | Smith | |
| 4,695,618 A | 9/1987 | Mowrer | |
| 4,760,956 A | 8/1988 | Mansfield | |
| 4,927,079 A | 5/1990 | Smith | |
| 4,967,956 A | 11/1990 | Mansfield | |
| 5,080,283 A | 1/1992 | Kukesh et al. | |
| 5,086,949 A | 2/1992 | Vulpitta et al. | |
| 5,143,296 A | 9/1992 | Saurwein et al. | |
| 5,170,939 A | 12/1992 | Martin | |
| 5,178,326 A | 1/1993 | Kukesh et al. | |
| 5,271,521 A | 12/1993 | Noss et al. | |
| 5,303,865 A | 4/1994 | Bert | |
| 5,344,490 A | 9/1994 | Roosen et al. | |
| 5,388,763 A | 2/1995 | Moses | |
| 5,388,767 A | 2/1995 | Moses | |
| 5,388,768 A | 2/1995 | Moses | |
| 5,400,971 A | 3/1995 | Maugans et al. | |
| 5,425,908 A | 6/1995 | Merser | |
| 5,678,764 A | 10/1997 | Kukesh | |
| 5,799,876 A | 9/1998 | Isler | |
| 5,829,679 A | 11/1998 | Strong | |
| 5,850,971 A | 12/1998 | Smith | |
| 5,979,794 A * | 11/1999 | DeFillipi et al. | 239/135 |
| 6,102,304 A | 8/2000 | Gonitzke et al. | |
| 6,428,200 B1 | 8/2002 | Fleischli et al. | |
| 6,533,189 B2 * | 3/2003 | Kott et al. | 239/303 |
| 6,554,204 B1 | 4/2003 | Nguyen et al. | |
| 6,601,782 B1 | 8/2003 | Sandholm et al. | |
| 6,666,385 B1 | 12/2003 | Gonitzke et al. | |
| 6,695,224 B2 | 2/2004 | Hunter | |
| 6,796,461 B1 | 9/2004 | Sinders | |
| 6,811,096 B2 | 11/2004 | Frazier et al. | |
| 6,824,071 B1 | 11/2004 | McMichael | |
| 7,021,498 B2 | 4/2006 | DiDonato et al. | |
| 7,306,171 B2 | 12/2007 | Weinberger et al. | |
| 7,357,564 B2 | 4/2008 | Reis et al. | |
| 7,527,172 B2 | 5/2009 | McMichael | |
| 7,694,893 B2 | 4/2010 | Zittel et al. | |
| 7,717,357 B2 * | 5/2010 | Gantenbein et al. | 239/432 |
| 7,744,019 B2 | 6/2010 | Merchant | |
| 7,918,369 B2 | 4/2011 | Kosmyna et al. | |
| 2003/0062427 A1 | 4/2003 | Bien | |
| 2003/0195651 A1 | 10/2003 | Cherfane et al. | |
| 2004/0217185 A1 | 11/2004 | Bien | |
| 2005/0035220 A1 | 2/2005 | Brown | |
| 2006/0266850 A1 | 11/2006 | Weinberger et al. | |
| 2008/0257979 A1 | 10/2008 | Crawford | |
| 2010/0151181 A1 | 6/2010 | Locke et al. | |

* cited by examiner

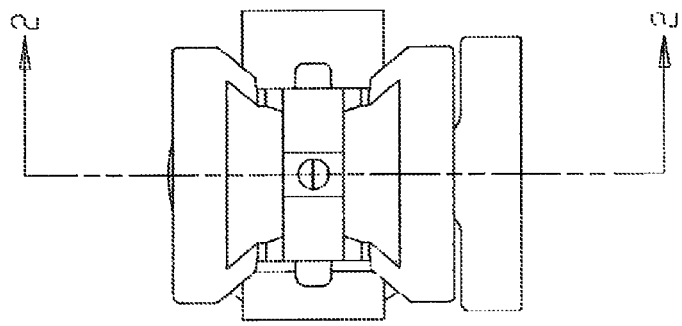
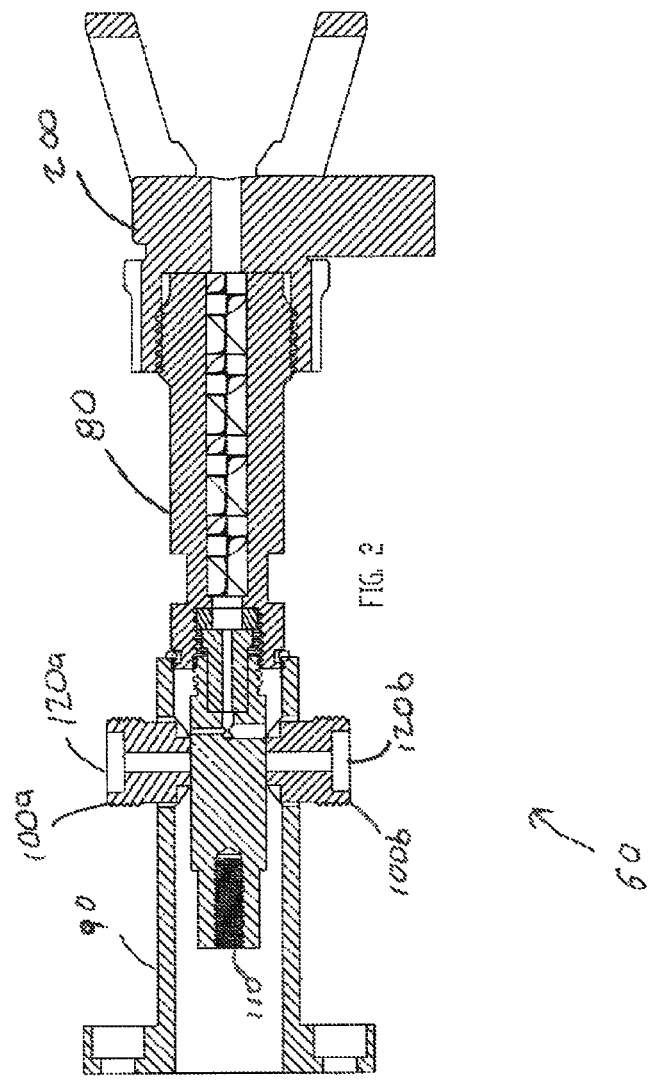
FIG. 2

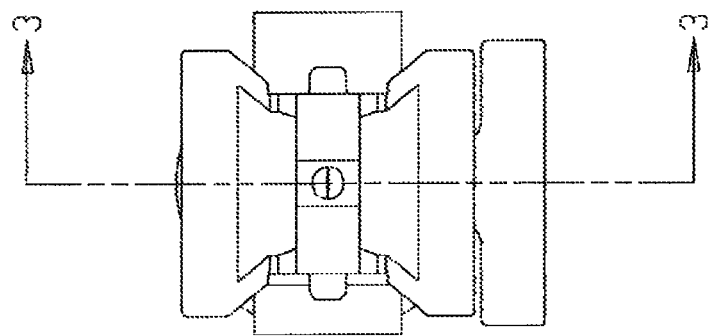
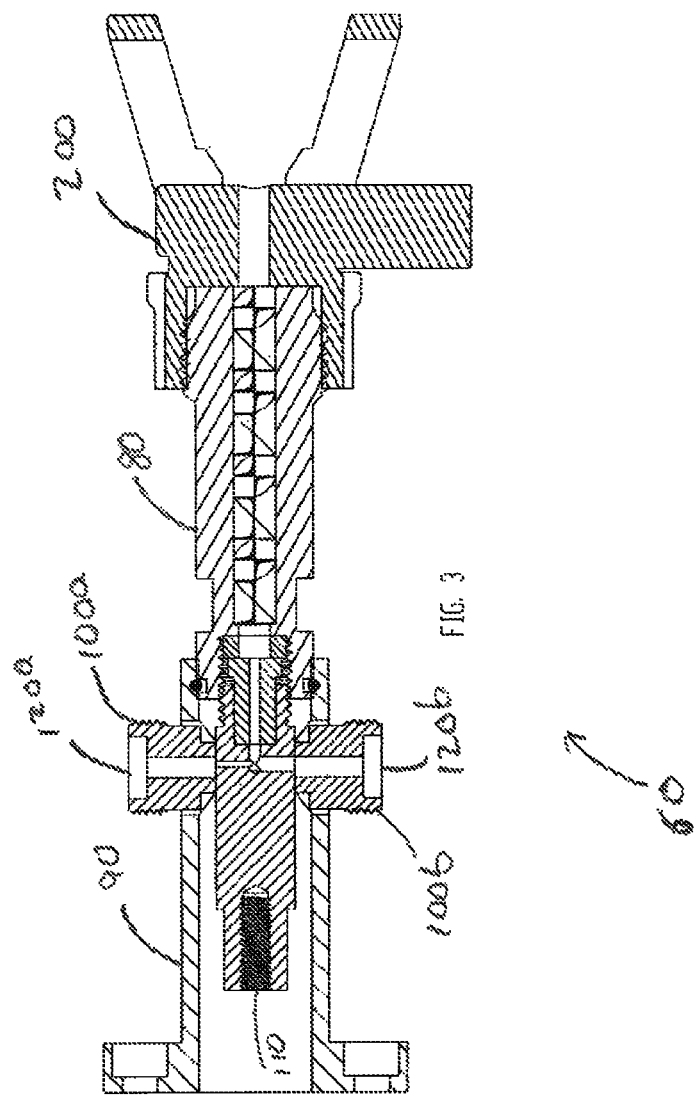
FIG. 3

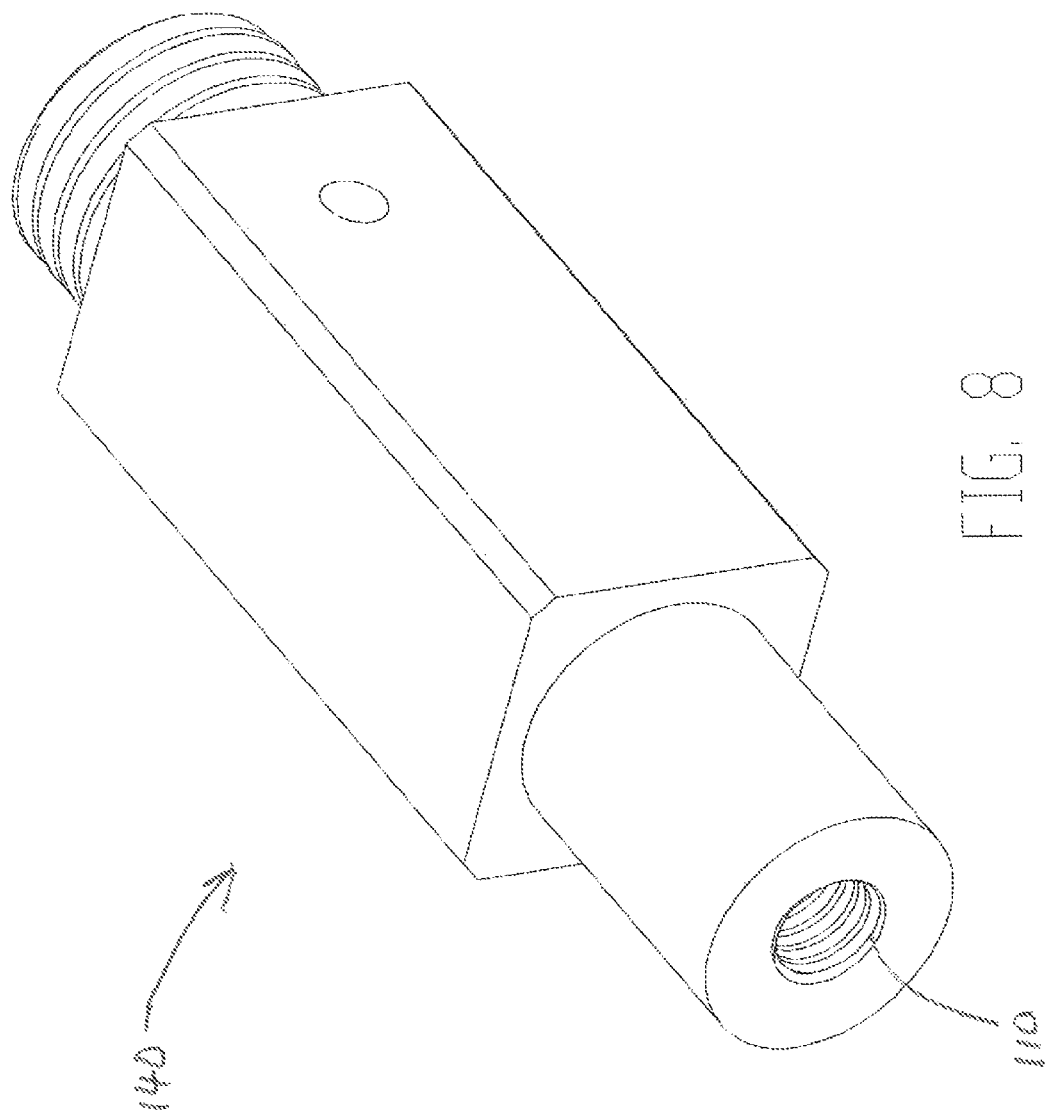

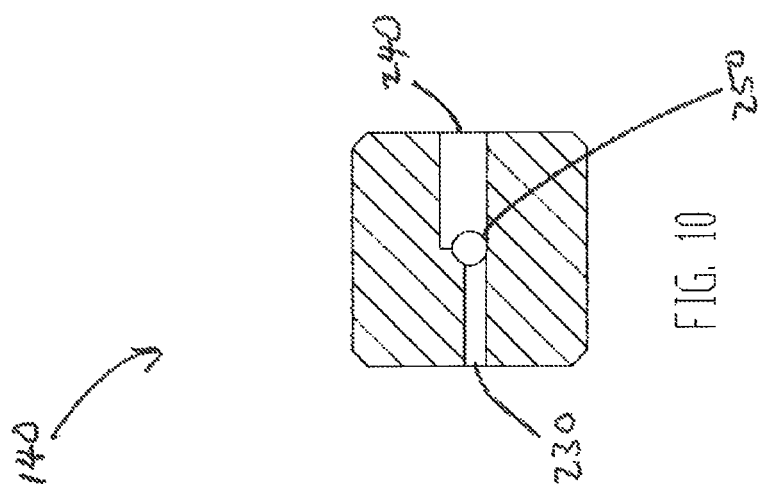
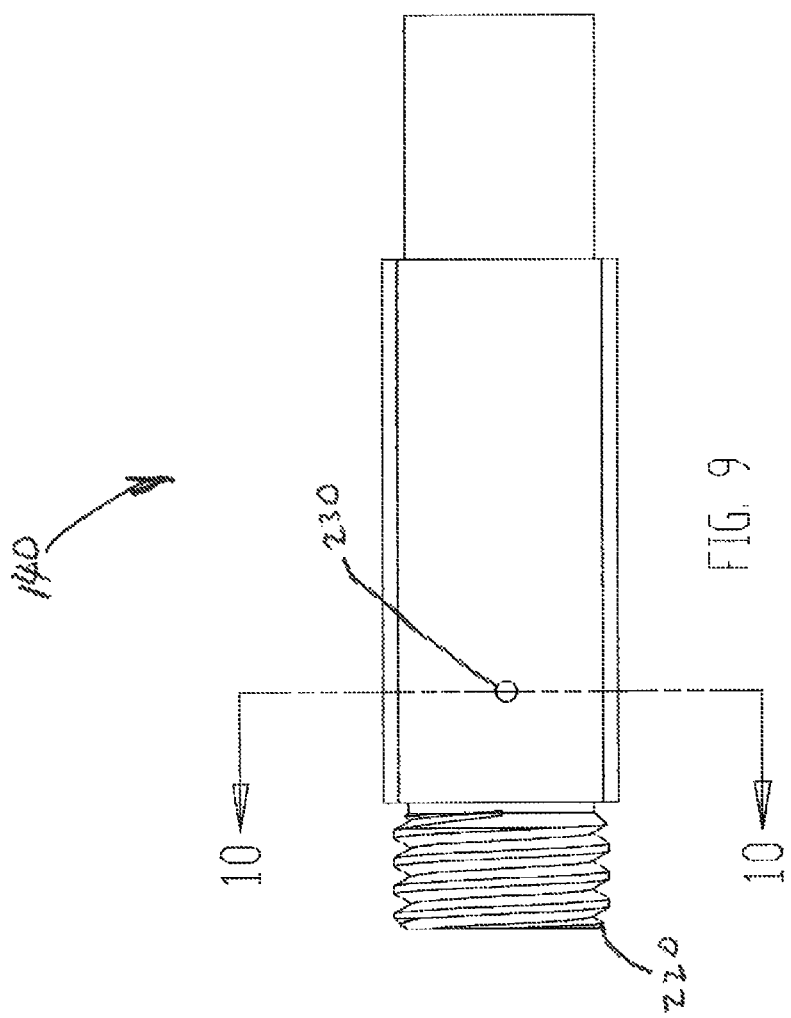

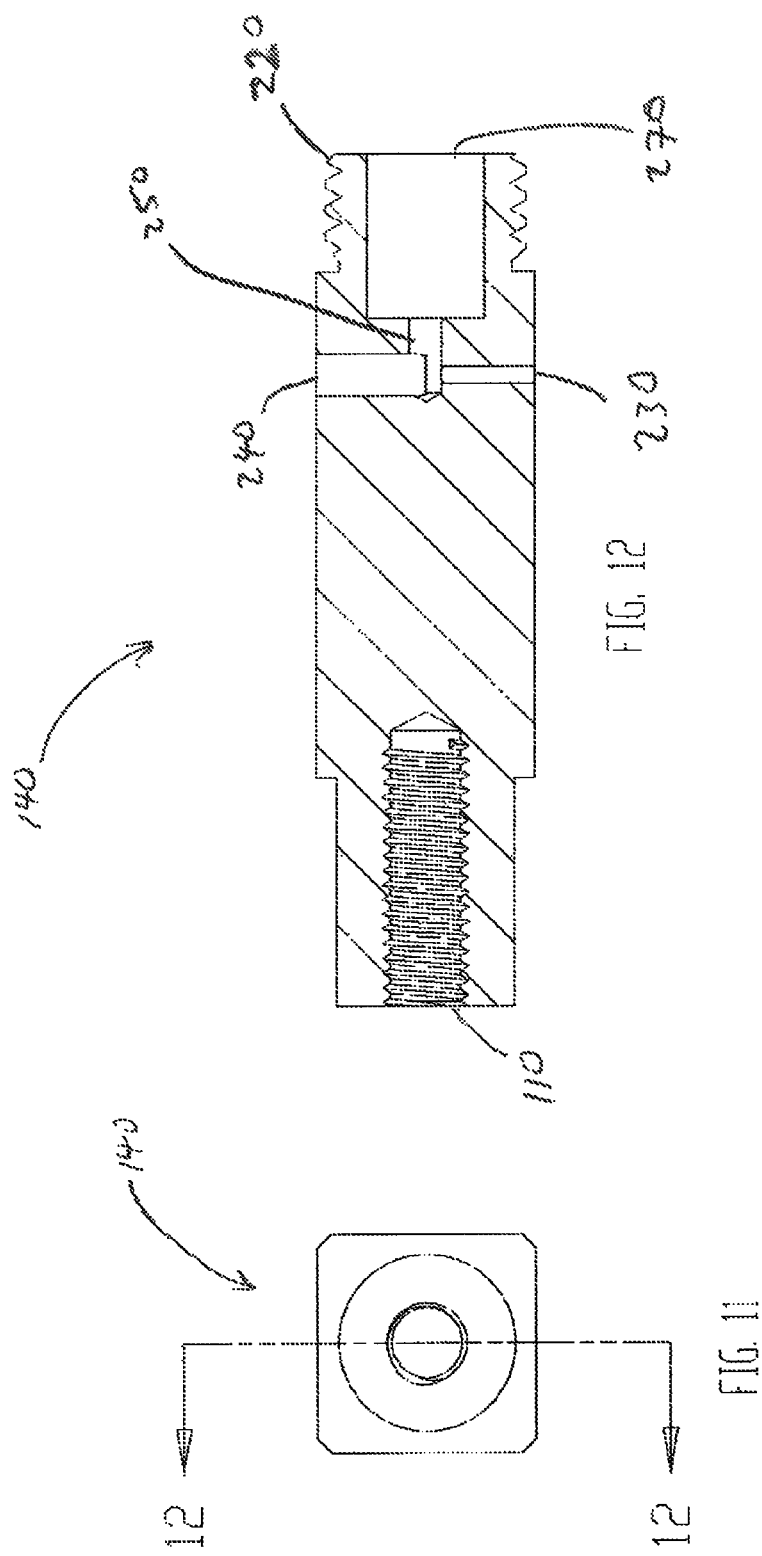

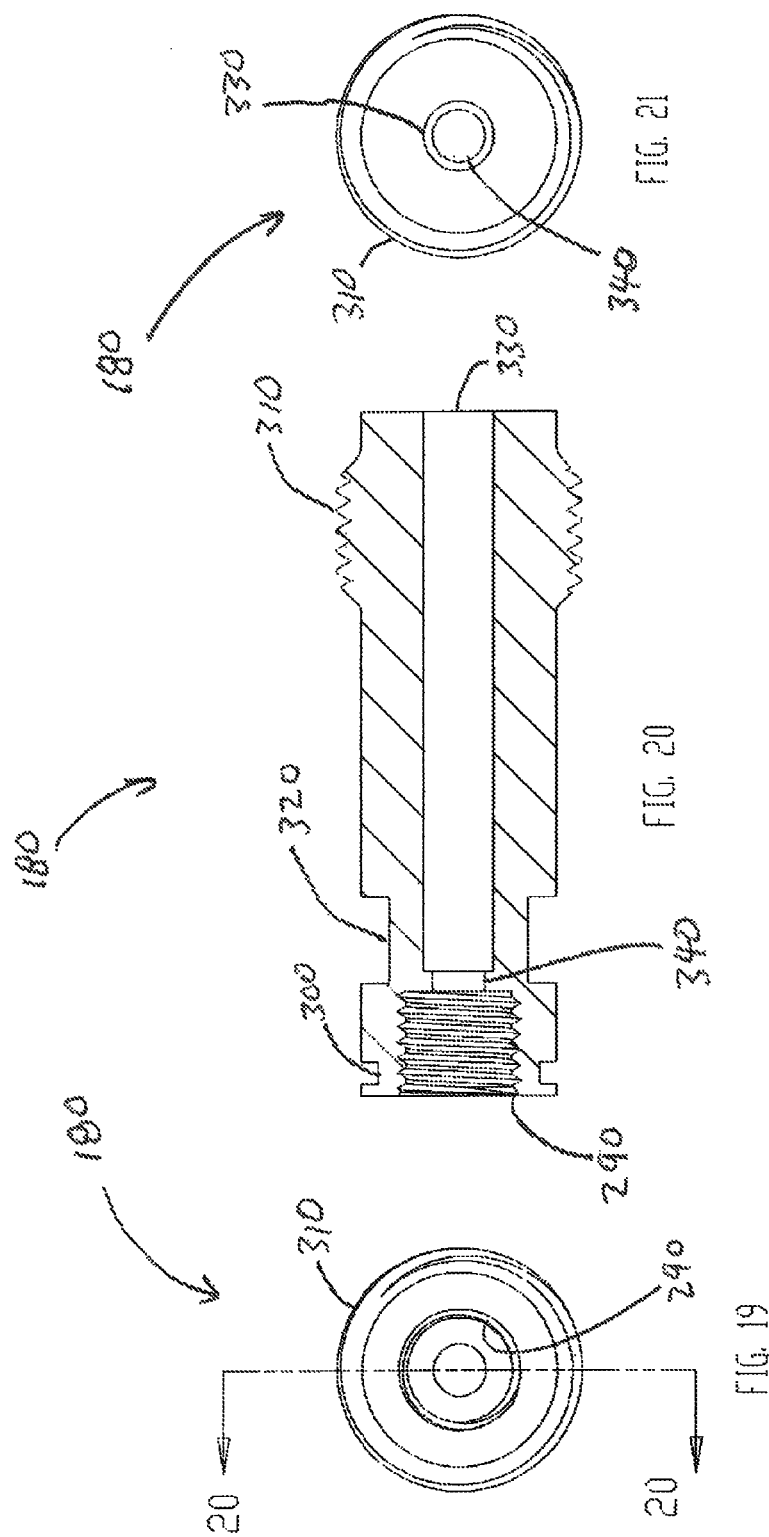

SOLVENT-FREE PLURAL COMPONENT SPRAYING SYSTEM AND METHOD

BACKGROUND OF THE INVENTION

1. Field of the Invention

This invention generally relates to methods and apparatus for spraying plural component materials without requiring the use of solvents to routinely flush or purge equipment or as part of the materials being dispensed.

2. Description of the Prior Art

Spray applied plural component thermoplastic and thermosetting materials have gained wide commercial acceptance as protective and decorative coatings. Similarly, spray applied foams are in widespread use throughout the world. Molded products produced from spray application equipment are also gaining greater acceptance and becoming popular in some industries. There is a large body of prior art with respect to these types of materials that usually come as two part formulations in which the respective parts chemically combine into finished form once dispensed from the spray application system. The cure rates and gel times vary widely for the various formulations from several hours to less than 10 seconds. In many formulations, the rates can be modified through the use of varying temperatures, types and amount of catalysts and other means.

Plural component formulations do occasionally come in 3, 4 or more parts but this is not the norm with the vast majority of plural component systems being two part systems. The respective components of a plural component system are often identified as a Part A and Part B respectively, with additional Part C, Part D, etc. in instances where there are more than the typical two fluid components involved. For purposes of this disclosure, the typical two part system and nomenclature will be used throughout although the applicants' intention is to not limit the scope of disclosure and claims to only two component systems by doing so. It is an accepted well known practice to introduce catalysts (accelerators), blowing agents, coloring agents, etc. as separate components in a plural component system rather than pre-blending such ingredients into one of the fluid components of a plural component system. However, describing these more complex systems can become cumbersome, particularly in the drawings, so the applicants respectfully ask readers to consider a plural component system as being defined herein as a formulation that comes in two or more parts.

Many formulations employ solvents in varying types and amounts either within the formulations themselves or to clean and purge some or all of the equipment components of the spraying systems known in the prior art. U.S. Pat. No. 4,695,618, issued to Norman R. Mowrer in 1987, discloses that a then "growing emphasis on compliance with government environmental and health regulations that limit both the type and amount of volatile organic compounds (VOC) has prompted coating manufacturers and end users to evaluate new coating technologies" (Col 1 Row 40-44). Since that time, manufacturers have produced an increasing number of formulations that are described in the art as being as much as 100% solids—a term used to describe the percentage of the ingredients that remain in the formulations after completion of the cure cycle. This confirms there has in fact been a long felt need to reduce or eliminate the use of said solvents and other volatile components from formulations and also from equipment purging and cleaning processes.

Manufacturers of formulations and equipment respectively are having difficulties developing new technologies that meet the tightening environmental and health requirements while meeting customer and end user demands for better solutions without increasing costs. In particular, eliminating the use of solvents has made it much more difficult to develop improved formulations that maintain 1:1 volumetric ratios with matched viscosities. The trend has been toward formulations that have widening ratios with 4:1 currently considered the maximum viable ratio. For the purposes of this disclosure, the standard ratios are: 1:1, 1.5:1, 2:1, 3:1 and 4:1 with ratios wider than that considered non-standard. Many practitioners consider ratios beyond 2:1 to be non-standard while recognizing that more formulations with wider ratios are coming into use.

It is desired to have spraying systems that go beyond this to accommodate in excess of 10:1 for some formulations. Generally, the widely held perception is that the further a ratio moves from 1:1, the more difficult it becomes to successfully mix and dispense the material. Viscosities are similarly becoming more divergent, generally increasing, with formulations known in the art that have viscosities increasing to as much as 1,000,000 cP (centipoise). In comparison, other materials have much lower viscosities, as little as 50 cP. It has therefore become a common practice to include elaborate heating systems to decrease the viscosity of thick materials such that they can be successfully pumped, mixed and dispensed using spraying technology. As a point of clarification, the term "spraying" is being used for expediency, while other applying or dispensing techniques are also envisioned.

U.S. Pat. No. 5,344,490, issued to Peter Paul Roosen et al. in 1994, discloses a plasticised gypsum composition that includes plural component formulations that have volumetric ratios ranging between 4:1 to 9:1 and large differences in viscosity between the respective Part A and Part B components. Roosen is one of the applicants herein and the disclosure of the '490 patent is incorporated herein by reference. Roosen '490 formulation Example 1 is for a plural component gypsum composition that contains 41% PBW (parts by weight) gypsum in total and is typically prepared in two parts with Part A being the gypsum and various other ingredients totaling 83% PBW and Part B being the balance 17% isocyanate. This 5:1 PBW ratio translates to a volumetric ratio of approximately 4.5:1 which is not a standard industry ratio and has therefore been difficult to dispense by means of a solvent-free spray application using conventional off the shelf equipment. Roosen and others were forced to use non-spraying means to dispense the formulations due to numerous failed attempts to disperse the material by means of a suitable spraying system.

The Roosen '490 patent also discloses a formulation in which the gypsum composition contains 75% PBW gypsum and a much smaller percentage of isocyanate (less than 7% PBW) that is produced into various finished products including products similar to those prepared using the above Example 1 formulation. This Example 2 formulation is quite similar to the Example 1 formulation with the increased amount of gypsum being the primary difference. It has always been one of Roosen's objectives to find a suitable means to spray apply the Example 1 formulation that contains 41% PBW gypsum and, if possible, to use spraying systems to apply formulations that have higher percentages of gypsum, approaching the 75% PBW gypsum level of the Example 2 formulation. Those efforts of almost 20 years have consistently failed. This failure is partly due to his lack of willingness to incorporate petrochemical solvents into the formulation or as part of a purging or routine flushing system for a spraying system.

The above Roosen formulations and products derived from them have been recognized in Canada and other countries as excellent examples of "green" and sustainable technologies that have minimal adverse impact on the environment. There have been further developments to replace the petrochemical derived isocyanate component with other materials to further enhance the green aspects. In fact, in 2010, Roosen was awarded a $100,000 cash prize for having won Canada's national "Greenvention" competition in front of millions of television viewers and he has been named the country's top "Eco-preneur". He has steadfastly refused to accept any proposed method to dispense formulations using spraying equipment that uses petrochemical solvents as either ingredients or part of a routine purging system, both of which are among common and widespread current industry practices.

As an interesting contrast, to the Roosen '490 formulations, Mowrer '618 reveals a series of two-component, solvent-free polyurethane compositions which may be combined at substantially 1:1 ratio by volume, and applied with commercially available, plural component, airless spraying equipment at ambient temperatures. He goes to some length in describing his formulations and reasons for conforming to various perceived technical limitations. His formulations appear to be composed of well marketed standard petrochemical ingredients produced by a relatively small number of well established chemical manufacturers. We believe that approach of conforming to a narrow band of technical constraints has the disadvantage of limiting the ability of practitioners to invent new and useful products of potentially greater value to customers and end users.

Furthermore, it makes it much more difficult to develop sustainable and environmentally sound solutions. Mowrer's approach, however, has been and continues to be preferred by equipment manufacturers.

Another important variable is pressure. Modern plural component spraying equipment has been engineered to operate at increasing pressures, currently in excess of 7,000 psi (50,000 kPa) for some systems. This is largely due to the need to successfully proportion, mix, and disperse solvent-free formulations with high viscosity components. The ability to operate at lower pressures is preferred to increase equipment life and operator safety while reducing operating and maintenance costs. Mowrer and others suggest system pressure and viscosity limits of 3,000 psi (21,000 kPa) and 1,000 cP (centipoises) respectively. Graco Minnesota Inc. is a well established Minneapolis based manufacturer of plural component spray equipment. In a 2011 Graco technical manual for the company's Fusion™ Solvent Purge Plural-Component Gun, there is an explicit instruction to balance the gauges at the required pressure. This Graco gun is a relatively heavy apparatus that is awkward and difficult to use due to its excessive weight and bulky size and it therefore has limited utility. In U.S. Pat. No. 7,744,019 issued to Matthew Merchant, there is an explicit expressed requirement to introduce the two respective components of a two part system into the mixing tube at the same pressures, which in this case is approximately 3,000 psi (21,000 kPa).

There is a strong tendency toward keeping viscosities, ratios and pressures matched that is well established in the prior art.

Although there has been a trend toward reducing the amount of solvent that is used within the formulations, the opposite has been the case for cleaning and purging plural component spray system equipment. There is a tremendous amount of prior art pointing toward likely millions of gallons (liters) a year of solvents used to clean and purge said equipment. For instance, it is common knowledge that for many epoxy coating systems of the 100% solids type, it typically takes approximately 5 gallons (20 liters) of solvent to purge and clean the equipment after each use. For a typical use of 50 gallons (200 liters) of said epoxy coating, that amount of solvent would be equivalent to having the formulation containing 10% solvent within it. It would appear that much of the benefit of reducing the solvent within the formulations is lost when taking account of the purging and cleaning requirements.

U.S. Pat. Nos. 7,918,369 5,678,764 6,544,204 5,178,326 4,760,956 4,695,618 4,967,956 6,811,096 and 6,824,071 are among the many examples of prior art explicitly applying solvent purging and cleaning systems. Graco appears to have substantial interest in many of these above patents and in publications such as WO 2009/036129 directed toward solvent injection systems. The company's current Fusion™ Solvent Purge Plural-Component Gun for which it claims patent pending status appears to represent the state of the art.

The solvent purge or flush spraying systems currently in widespread use typically employ a set of ratio proportioning pumps that deliver two or more respective components of a plural component fluid formulation under pressure to a manifold where the two streams are combined after which the combined fluids are forced through one or more static mixing elements located in the fluid path, through a single hose or tube often called a whip then through a spray gun which dispenses the mixed material. Static mixers can also be located further downstream and are sometimes found in the gun itself or at more than one location in the mixed fluid pathway. A separate solvent pump delivers a stream of solvent which is pumped through the manifold, static mixing elements, whip and gun at the end of each operating cycle to purge any mixed material from the system before such mixed material cures and clogs one or more parts of the system. U.S. Pat. No. 5,178,326, issued to Timothy S. Kukesh et al., is directed to such a system with the inclusion of additional compressed air impingement acting on the mixed material after exiting the spraying orifice of the spray gun. Kukesh '326 illustrates this conventional solvent purge approach quite well.

There is also prior art describing spraying equipment that has been designed for mixing in the gun very close to the spraying orifice. The mixing of the plural component formulations occurs in a small mixing chamber through the impingement mixing of plural fluid streams that exit the spraying orifice, sometimes referred to as a spray tip, very near the location of the impingement mixing. For clarification, the plural components are brought into the gun separately and mixed very close to the spray tip. U.S. Pat. No. 7,527,172, issued to Jonathan R. McMichael, is directed toward improvements in such a plural component (two components) mixing and dispensing apparatus. The McMichaels '172 apparatus requires the volumetric proportioning ratio to be near or at 1:1, the fluid viscosities of the respective two fluids to be relatively low and closely matched and the pressures to be relatively closely matched because it relies on impingement mixing to mix the two fluid components. These types of spray guns are primarily used for fast set urethane foams that normally cure in a matter of seconds. Many of the impingement mixing type guns that are typically used for fast setting urethane foams and ureas also employ solvent purging although it is not as necessary as for the more common non-impingement mixing type of gun where solvent usage is widespread. Some of the impingement mixing type guns including the one disclosed in McMichaels '172 use air to purge the relatively small amount of mixed material that needs to be quickly purged at the end of each use of the gun. Guns of this type are not effectively being used for non-standard ratio formulations, particularly where there are high viscosity fluids involved. Attempts to use impingement mixing guns for such materials generally produce inadequate results due to insufficient mixing, poor spray pattern, clogging or a combination of these.

U.S. Pat. No. 3,799,403, issued to Richard O. Probst et al., the disclosure of which is incorporated herein by reference, discloses a spray gun in which the mixing chamber is movable with respect to the housing as a practical and simple means of stopping and starting the flow of plural fluid components and also so that a gas such as compressed air can be used to purge the mixing chamber of the mixed residue of plural component material upon termination of the dispensing operation. Although such guns have been in use for many years, it is difficult to obtain consistent, high quality mixing of the fluid components, especially when the ratios, viscosities and/or pressures are uneven.

Another strategy for purging plural component system is to shut off one of the fluid components and let another fluid component continue to flow to purge mixed material from the system. This is often ineffective due to what is sometimes referred to as a crossover effect, whereby the purge fluid flows in a reverse direction toward where the fluid component that has been shut off normally enters the mix chamber. This is where mixed material builds up and eventually clogs or impedes flow.

OBJECTS OF THE INVENTION

Rather than follow the current trend toward having the formulations engineered to suit the perceived equipment limitations, the applicants are taking the opposite approach by inventing a solvent-free spraying system and engineering the methods and apparatus to accommodate a much wider range of formulation variations. One object of the invention is to facilitate the continuing trend toward reduced use of solvents within the formulations while eliminating the need to use solvents to purge and clean the spray system equipment.

Another objective is to provide a spray system that allows formulators to successfully mix and disperse a much wider range of products than the industry is currently accustomed to. For instance, a spray system which can readily and reliably handle a wide range of ratios and a large difference of viscosities and pressures between respective part A and part B of a two component formulation, would be expected to be of considerable value to formulators, their customers and end users alike.

A third object of the invention is to enhance the ability, where desired, to greatly reduce gel and cure times for the various foams, coatings and molded products made from urethanes, ureas, epoxies, polyesters, phenolics and other chemical compositions, including those not yet invented.

SUMMARY OF THE INVENTION

The present invention is directed to a plural component spraying system that does not require the use of solvents to flush or purge materials from the system. The formulations being mixed and dispensed through the spraying system can have widely varying viscosities and ratios without there being a need to precisely match the pressures or temperatures of the respective fluid components. The system will facilitate the use of fast cure and gel times where desired for mixing and dispensing various plural component thermoplastic and thermosetting formulations.

Cure rates and gel times can vary widely from hours to less than 10 seconds for mixing and dispensing various plural component thermoplastic and thermosetting materials including foams, moldings and coatings made from urethanes, ureas, epoxies, polyesters, phenolics and other chemical compositions that react rapidly upon mixing of the components thereof.

When describing the present invention, all terms not defined herein have their common art-recognized meanings.

The spraying system of the present invention comprises: a set of ratio proportioning pumps for delivering two or more respective components of a plural component fluid formulation under pressure into a mixing and spraying apparatus installed in a gun housing; a heating system to heat the respective fluid components, preferably with sufficient control to enable individual temperature control of the respective fluid components entering the mixing and spraying apparatus; a mixing and spraying apparatus which includes an impingement mixing element, a static mixer housing that contains one or more static mixing elements downstream of the point at which the respective fluid components enter the impingement mixing element portion of the mixing and spraying apparatus through separate entry or injection ports, a spraying orifice located downstream of the impingement mixing element and a backpressure element located somewhere between the fluid entry point and spraying orifice, preferably immediately upstream of the static mixing element(s); and a means for easily and quickly removing the static mixer housing containing the static mixer element(s). An important aspect of the invention is to be able to take the easily removable static mixer housing and mechanically or otherwise remove the static mixer element(s). The current preference is to have the mixing elements consisting of drillable plastic disposable pieces that are drilled out using a simple hand-drilling operation or a drill press, replaced with new element(s) and able to be quickly put back into service. The currently preferred spraying orifice is a standard reversible tip style orifice that is commonly available at many hardware stores and has interchangeable tips of various orifice sizes and geometries that allows an operator to dispense material at various flow rates and to create various spray patterns. Another preferred embodiment is to use an injection or pouring orifice in place of the spraying orifice for use in crack filling, mold filling or other operations that do not require material to be applied in an atomized form. The preferred means of starting and stopping the fluid components entering the mixing and spraying apparatus is through the use of a movable mixing and spraying apparatus that is movable with respect to the gun housing. This has the added benefit of providing the means for delivering an immediate air purge at the end of each dispensing operation, the inclusion of such means being strongly preferred.

The spray gun portion of the present invention can be configured as either a heavy duty industrial device for use on a production line or as a compact and light weight device for hand-held use or for robotic use in various areas, especially those areas where there are relatively tight geometric constraints.

The invention enables more than just the elimination of the solvents normally used to purge mixed materials from the conventional spraying systems. It also enables greatly increased cure rates for the epoxy and other materials, reducing the normal 20 minute to one hour gel times with 24 hour cures to seconds and minutes respectively. The longer gel and cure times are required with solvent flush systems due to the long residency time required in the mixing manifold, whip hose, gun, spray tip and related fittings for the mixed material that needs to be purged out. Since about 5 gallons (20 liters) of solvent are required for each system purge, operators need the extra gel time to avoid having to flush too often. With the system of the present invention, since the mixing is in the gun and there is no solvent purge requirement and the mixed material residency time within the system is greatly decreased, the materials can be reformulated with far shorter gel and cure times.

The invention also enables formulators to design plural component materials outside the standard 1:1 through 4:1 volumetric ratios and with large differences in viscosities in the respective fluid components of these formulations. For example, a two part formulation with a 5:1 ratio of part A to part B respectively and with the viscosity of part A being 100 to 1000 times greater than that of part B can be thoroughly mixed and dispensed using the invention. Cure rates can be in seconds or minutes, the respective fluid component pressures do not need to be closely matched and there is no solvent purging requirement. This will be more fully described in the detailed description herein.

Further features of the invention may become apparent to those skilled in the art from a review of this summary and the following detailed description, taken in combination with the appended claims. While the invention is susceptible of embodiments in various forms, described hereinafter are specific embodiments of the invention with the understanding that the present disclosure is intended to be illustrative, and is not intended to limit the invention to the specific embodiments described herein.

The drawings and more detailed description of the preferred embodiment that follow comprises one example of the invention. Other embodiments of the invention will be apparent to those skilled in the art from the drawings and more detailed description that follows.

BRIEF DESCRIPTIONS OF THE DRAWINGS

FIG. 2 is a cross-sectional top view of one spray gun apparatus usable in the invention, taken at the horizontal plane and in the direction indicated by line 2-2 of the accompanying front view, in the non-dispensing air-purging position;

FIG. 3 is a cross-sectional top view of the preferred spray gun apparatus, taken at the horizontal plane and in the direction indicated by line 3-3 of the accompanying front view, in the material dispensing position;

FIG. 6b is a perspective view of the preferred spray gun of FIG. 3, without the gun housing, said apparatus in this figure also referred to as the mixing and spraying apparatus portion of the invention;

FIG. 8 is a perspective view of the preferred impingement mixing element of FIG. 7;

FIG. 9 is a side view of the preferred impingement mixing element of FIGS. 7 and 8;

FIG. 10 is a cross-sectional end view of the preferred impingement mixing element, taken at the vertical plane and in the direction indicated by line 10-10 of FIG. 9;

FIG. 11 is a rear view of the preferred impingement mixing element of FIGS. 7, 8 and 9;

FIG. 12 is a cross-sectional side view of the preferred impingement mixing element of FIGS. 7, 8 and 9, taken at the vertical plane and in the direction indicated by line 12-12 of FIG. 11;

FIG. 19 is a rear view of the preferred static mixer housing of FIGS. 7 and 18;

FIG. 20 is a cross-sectional side view of the preferred static mixer housing of FIGS. 7 and 18, taken at the vertical plane and in the direction indicated by line 20-20 of FIG. 19;

FIG. 21 is a front view of the preferred static mixer housing of FIGS. 7 and 18.

DETAILED DESCRIPTION OF THE CURRENTLY BEST KNOWN MODE OF THE INVENTION

Figure 1:
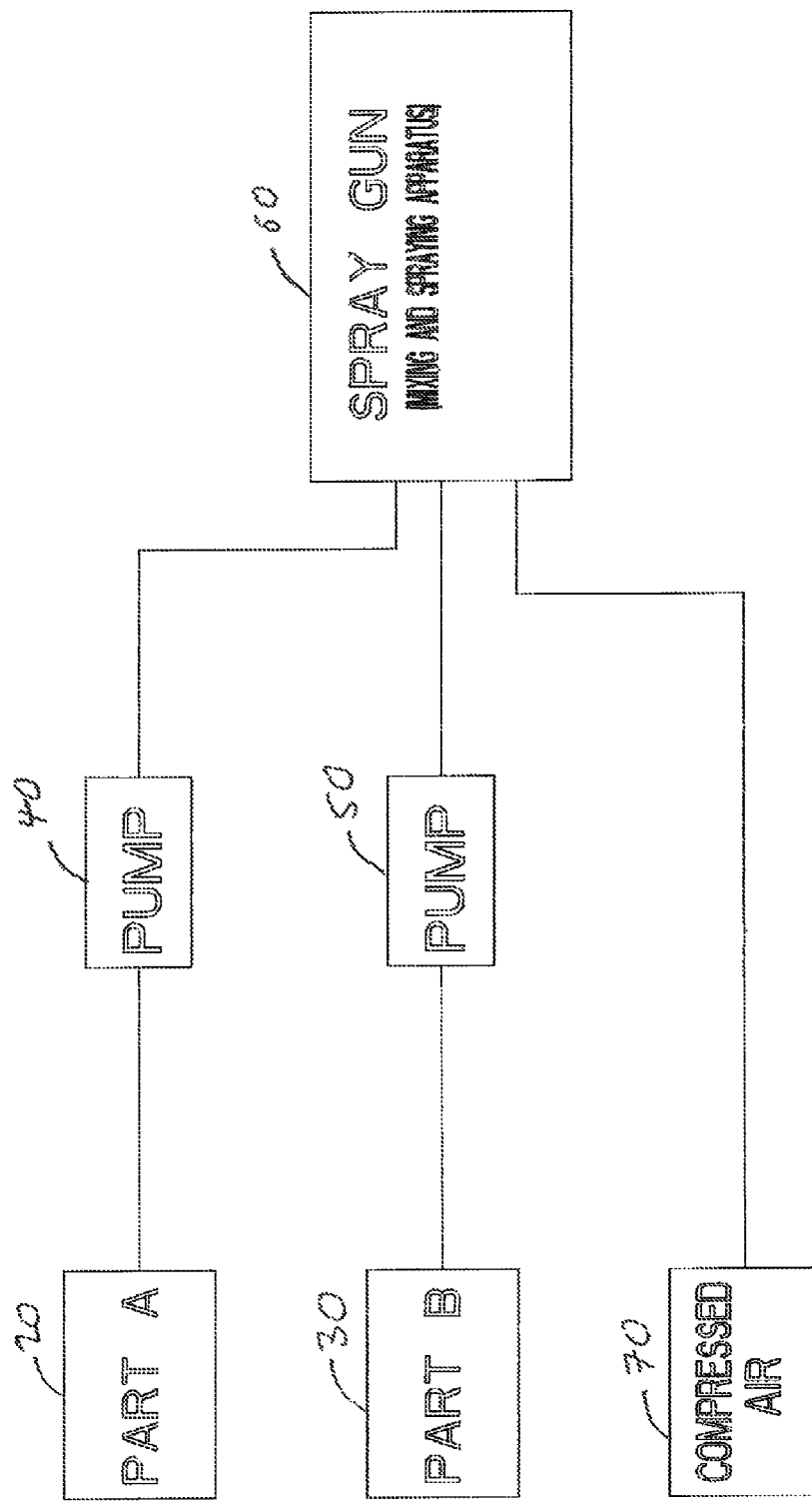
FIG. 1 is a simplified schematic diagram of a solvent-free plural component spraying system according to a presently preferred embodiment of the invention.

FIG. 1 is a simplified schematic diagram of the spraying system 10 of the present invention that in general terms comprises a solvent-free system for mixing and spraying plural component formulation in which a part A fluid component supply 20 and a part B fluid component supply 30 are pumped through a set of ratio proportioning pumps 40 and 50 for part A and part B respectively with the pumps delivering the streams of fluid to the mixing and spraying apparatus portion of the invention, also referred to as a spray gun 60, in a volumetric proportion of a set ratio that can be set mechanically, electronically or some other suitable means known to someone of ordinary skill in the art. There are several equipment packages available that can deliver the respective fluids to the spray gun at suitable pressures, temperatures and flow rates while maintaining the desired volumetric ratios with sufficient control to ensure consistent delivery of the respective fluid components. Someone of ordinary skill in the art can arrange suitable equipment packages from a variety of sources including suppliers who specialize in providing plural component spraying equipment. The applicants have no specific preference other than to suggest that whatever equipment is utilized should have the ability to control the temperatures of the respective components individually throughout the system. A supply of compressed air 70 is also delivered to the spray gun 60 to provide a means of purging a portion of the gun after each operation and also for, optionally, use as part of the actuation process as will be more fully described. The compressed air supply is not essential where other means of carrying out these functions are employed although it is a preferred method.

FIG. 2 is a cross-sectional top view of one spray gun 60 usable in the invention, taken at the horizontal plane and in the direction indicated by line 2-2 of the accompanying front view, in the non-dispensing air-purging position. The spray gun 60 has a mixing and spraying apparatus 80 installed in a gun housing 90. The part A and part B fluid components enter through the fluid component connection blocks 100a and 100b respectively. In the position shown in this drawing, the fluids are prevented from entering the spraying and mixing apparatus 80 because it is movable relative to the gun housing 90 and is shown in the forward position in which the respective fluid components that come into the connection blocks 100a and 100b respectively under pressure through connection block ports 120a and 120b are prevented from entering because there are no open passages through which the fluids can be received. The mixing and spraying apparatus 80 is moved relative to the gun housing 90 by applying a force through the threaded connection 110 and either pushed to the right to the position shown in the drawing or pulled to the left to the material dispensing position. The spray gun 60 of the present invention can be configured as either a heavy duty industrial device for use on a production line or as a compact and light weight device for hand held use or for robotic use in various areas, especially those areas where there are relatively tight geometric constraints.

FIG. 3 is a cross-sectional top view of one spray gun 60 usable in the invention, taken at the horizontal plane and in the direction indicated by line 3-3 of the accompanying front view, in the dispensing position. The spray gun 60 consists of a mixing and spraying apparatus 80 installed in a gun housing 90. The part A and part B fluid components enter through the fluid component connection blocks 100a and 100b respectively. In the position shown in this drawing, the fluids are able to enter the spraying and mixing apparatus 80 because it is movable relative to the gun housing 90 and is shown in the rearward position in which the respective fluid components that come into the connection blocks 100a and 100b respectively under pressure through connection block ports 120a and 120b are able to enter because there are open passages available through which the fluids can enter. The mixing and spraying apparatus 80 is moved relative to the gun housing 90 by applying a force through the threaded connection 110 and either pulled to left to the position shown in the drawing or pushed to the right to the non-dispensing air-purging position.

Figure 4:
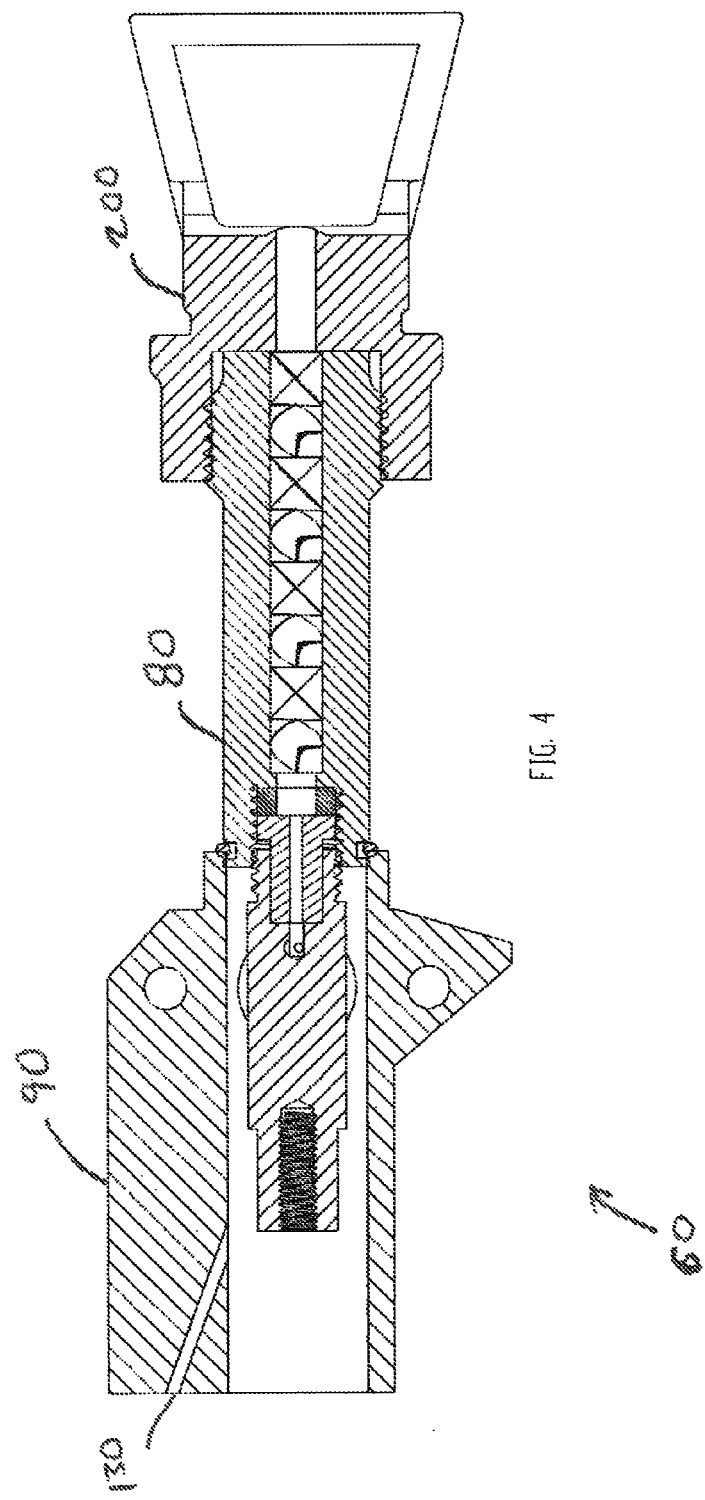
FIG. 4 is a cross-sectional side view of the preferred spray gun apparatus, taken at the vertical plane and in the direction indicated by line 4-4 of FIG. 5, in the non-dispensing air-purging position.

FIG. 4 is a cross-sectional side view of the preferred spray gun apparatus 60, in the non-dispensing air-purging position. This drawing shows a port 130 through the casing of the gun housing 90 into which compressed air and/or other suitable gaseous or liquid fluids can be introduced under pressure. In the position shown, the fluid is able to enter the mixing and spraying apparatus because the fluid is not blocked by the connection blocks 100a and 100b. This can be seen more clearly in the FIG. 2 drawing although the port 130 cannot be seen in the FIG. 2 view.

Figure 5:
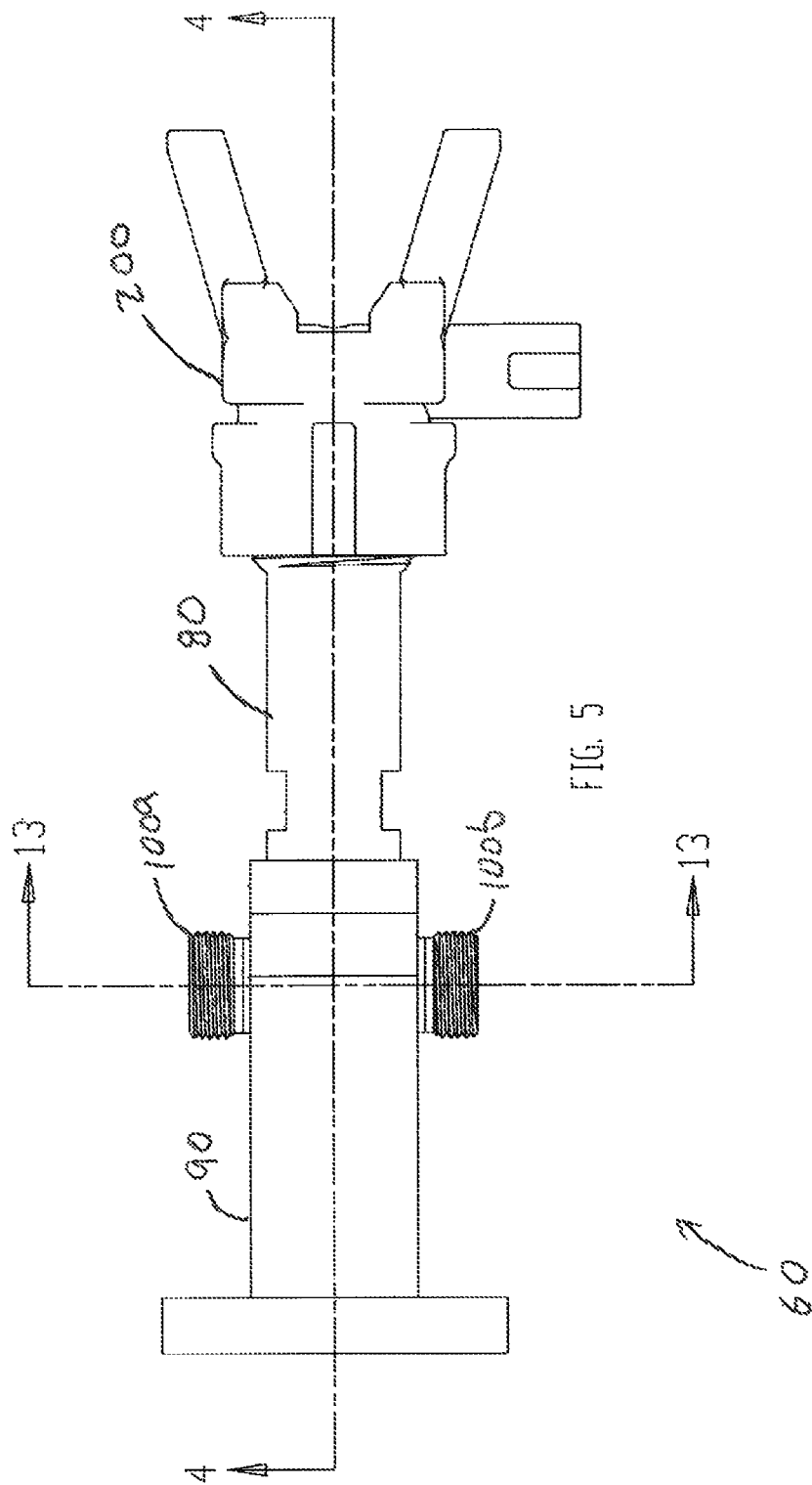
FIG. 5 is a top view of the preferred spray gun of FIG. 3, in the material dispensing position.

FIG. 5 is a top view of the preferred spray gun 60, in the material dispensing position. The part A and part B fluid components enter through the connection blocks 100a and 100b respectively. The mixing and spraying apparatus 80 portion of the spray gun 60 is in the retracted position relative to the gun housing 90 in this material dispensing position.

Figure 6A:
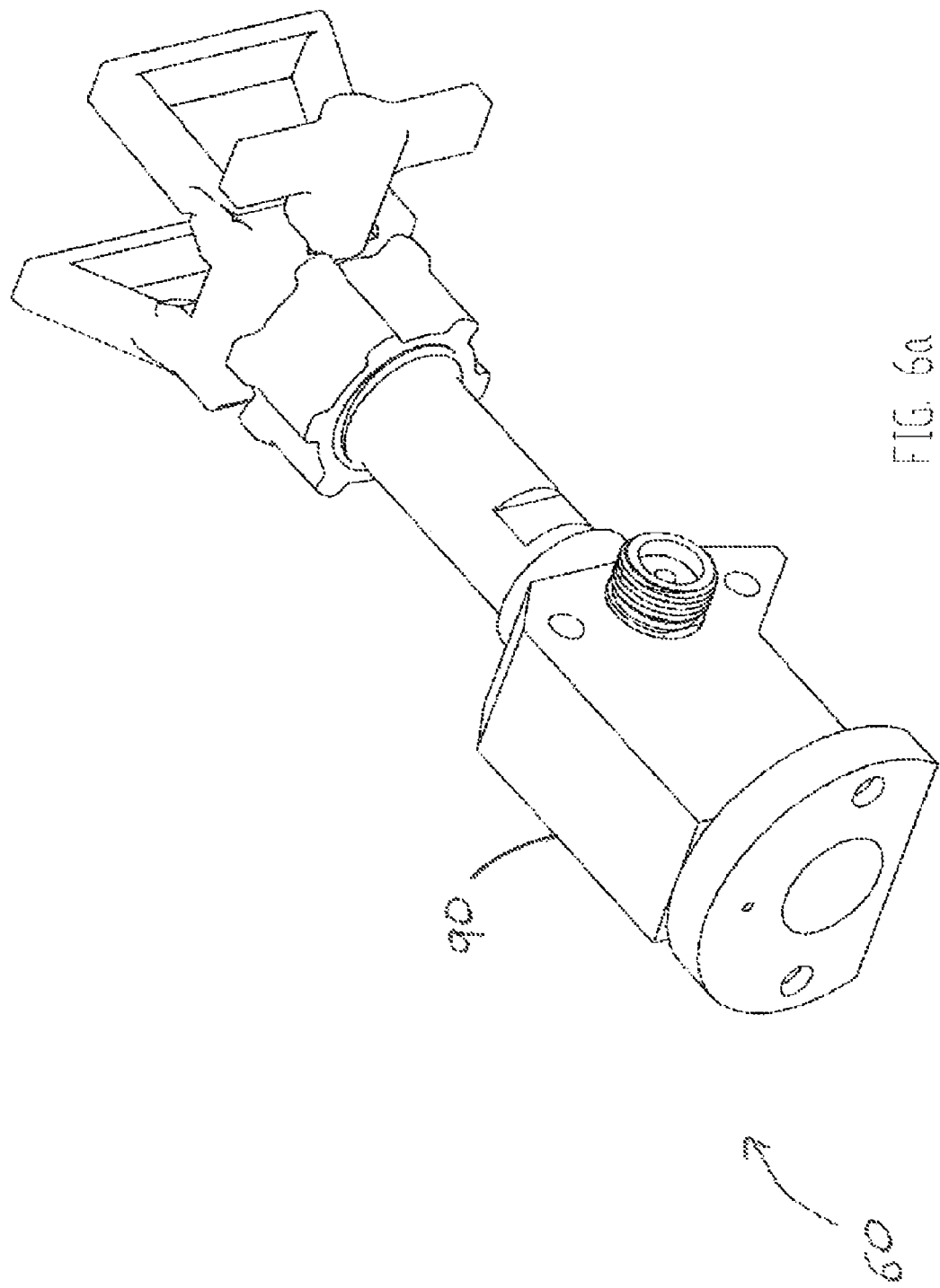
FIG. 6a is a perspective view of the preferred spray gun of FIG. 3, including the gun housing.
Figure 6A:
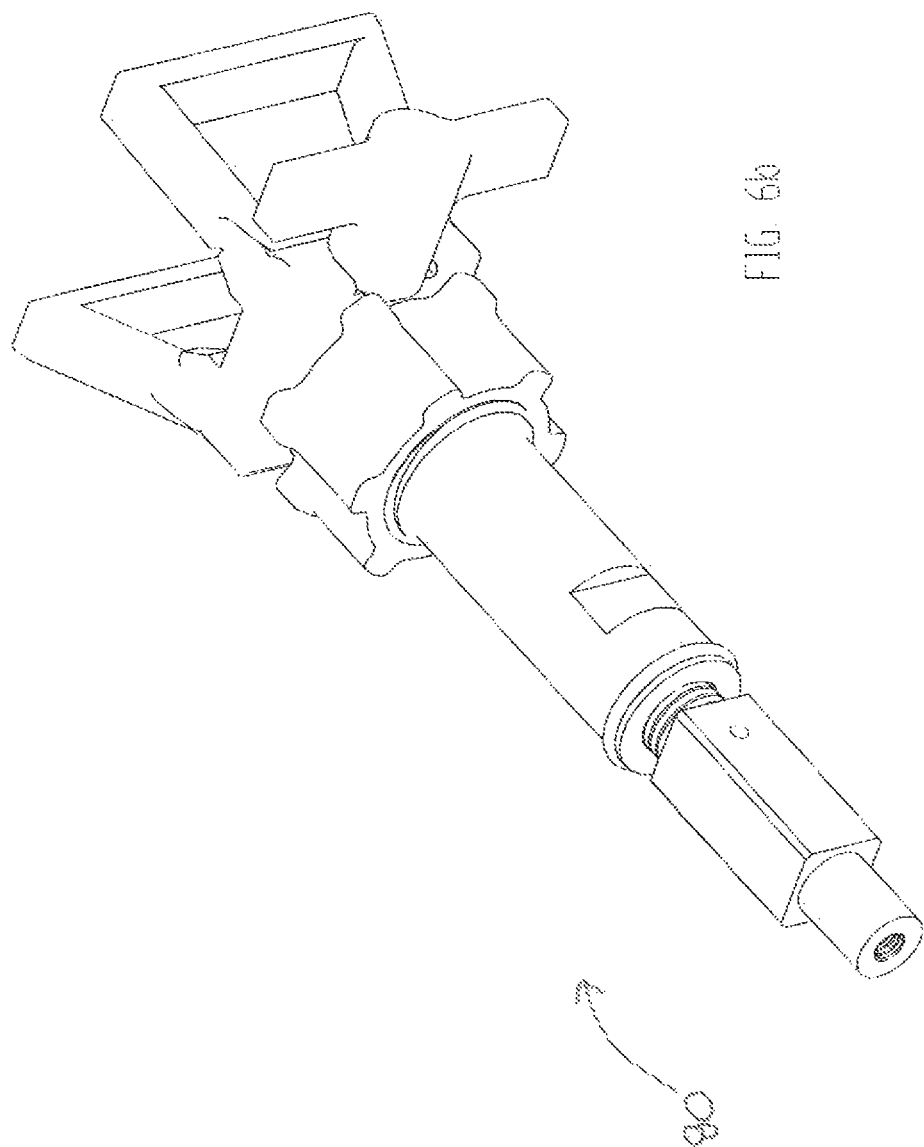

FIG. 6a is a perspective view of the preferred spray gun 60, including the gun housing 90.

FIG. 6b is a perspective view of the preferred spray gun 60, without the gun housing, said apparatus in this figure also referred to as the mixing and spraying apparatus 80 portion of the invention.

Figure 7:
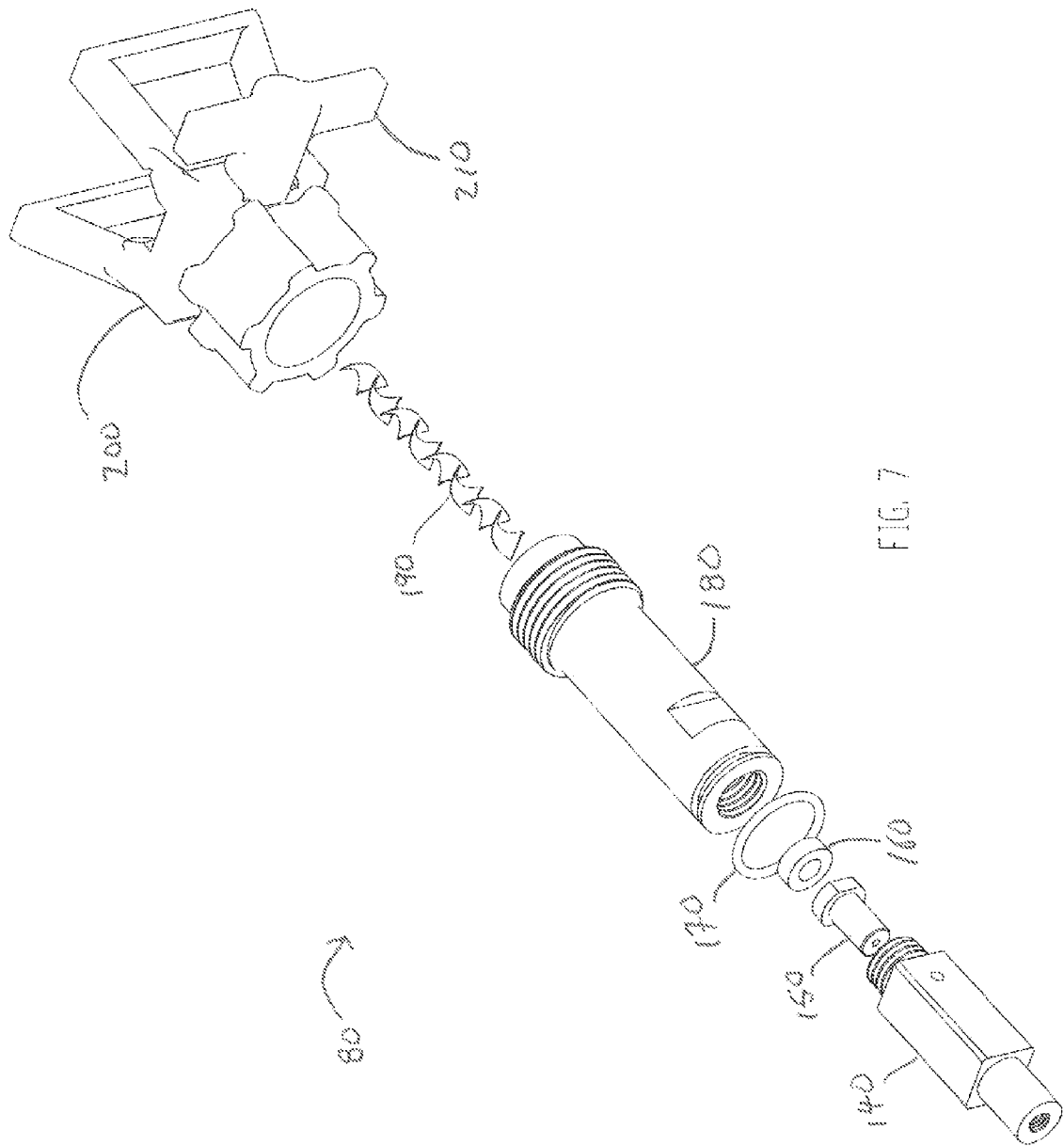
FIG. 7 is an exploded view of a preferred embodiment of the mixing and spraying apparatus portion of the invention.

FIG. 7 is an exploded view of a preferred embodiment of the mixing and spraying apparatus 80. The apparatus consists of an impingement mixing element 140, into which a back-pressure element 150 is inserted. A washer 160 acts to seal the static mixer housing 180, which, in this preferred embodiment, is screwed onto the impingement mixing element 140. There is an O-ring 170 that is used to form a seal between the static mixer element 140 and the gun housing 90 to prevent purge air from escaping while a sliding fit is maintained between the mixing and spraying apparatus 80 and the gun housing 90. A static mixing element 190 is inserted into the static mixer housing 180 and held in place by the spraying orifice 200. The preferred spraying orifice 200 is a commonly available type that includes an easily interchangeable reversible tip 210 of various orifice sizes and geometries to provide a range of flow rates and a variety of spray patterns. The drawing shows the tip 210 perpendicular to the direction of flow, this being the off position. The spraying orifice is connected to the static mixer housing 180 by means of a threaded connection.

The preferred static mixing element 190 is a plastic disposable type which can be quickly and easily replaced by unscrewing the spraying orifice 200 from the static mixer housing 180 and drilling out the disposable static mixing element 190 and replacing it by simply pushing in a new one. The spraying orifice 200 is then screwed back onto the static mixer housing 180 and the spraying system 10 is again operational. Optionally, in this preferred embodiment, the static mixer housing 180 can be unscrewed from the impingement mixing element 140 and quickly replaced with a fresh static mixer housing 180 containing a new static mixing element 190. The one that was replaced can be renewed offline without interfering with spraying operations. The elements can be drilled out or removed by other means such as by using heat to melt, bake or burn them out, or force to push them out and/or a small amount of solvent, less than 1 liter, can also be used to aid in the process of removing said elements. Additionally, in the preferred embodiment, there is a range of static mixer housings available in different lengths and with different inside diameters to accommodate a variety of static mixing elements. More than one element or type of element can be installed into the housing to provide a variety of mixing characteristics that someone of ordinary skill in the art can determine suitable for a particular plural component formulation.

FIG. 8 is a perspective view of the preferred impingement mixing element 140. An actuator of mechanical, pneumatic, hydraulic, electric or other type is attached to the thread 110 at the rear end and used to apply sufficient force to push or pull the impingement mixing element longitudinally.

FIG. 9 is a side view of the preferred impingement mixing element 140. The thread 220 is used to connect it to the static mixer housing 180. Fluid inlet or injection port 230 shown in this drawing is where one of the plural component fluids enters under pressure. There is another one on the opposite side of the impingement mixing element 140, although not necessarily of the same size.

FIG. 10 is a cross-sectional end view of the preferred impingement mixing element 140. In this preferred embodiment, the two respective fluid component injection ports 230 and 240 are slightly offset at approximately 0.011 inches (0.028 cm) from the center axis of the impingement mixing element 140. The respective port sizes also differ from the size of the impingement mixing chamber 250. In this preferred embodiment, one of the injection port 240 sizes is of a substantially larger diameter at approximately 0.094 inches (0.24 cm) than the other injection port 230 at approximately 0.042 inches (0.11 cm). The diameter of the impingement mixing chamber 250 in this preferred embodiment at approximately 0.069 inches (0.18 cm) is somewhat smaller than the larger injection port. Fluid entering the chamber does so in a turbulent manner combined with some tendency toward swirling due to the offsets.

FIG. 11 is a rear view of the preferred impingement mixing element 140.

FIG. 12 is a cross-sectional side view of the preferred impingement mixing element 140. There is a thread 110 at the rear end for attachment to an actuator and a thread 220 at the opposite or front end to attach to the static mixer housing 180. The arrangement of the fluid component injection ports 230 and 240 as well as the impingement mixing chamber 250 can be seen quite clearly in this drawing. The larger backpressure element insertion cavity 270 at the front end is where the backpressure element 150 is inserted.

Figure 13:
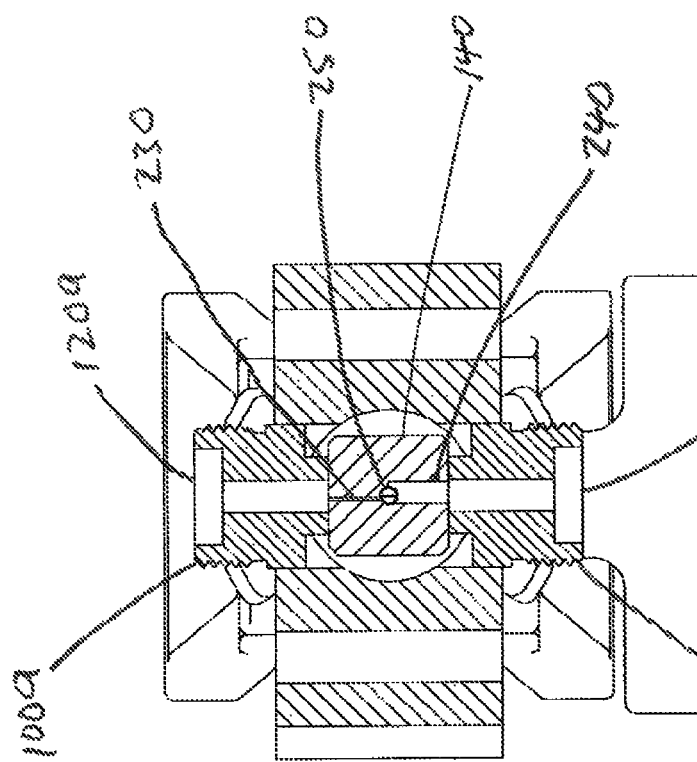
FIG. 13 is an enlarged partial cross-sectional end view of FIG. 5, taken at the vertical plane and in the direction indicated by line 13-13 of FIG. 5 to illustrate the sealed interface between the impingement mixing element and its connection blocks in the gun housing, in the material mixing and dispensing position.

FIG. 13 is an enlarged partial cross-sectional end view of FIG. 5, taken at the vertical plane and in the direction indicated by line 13-13 of FIG. 5 to illustrate the sealed interface between the impingement mixing element 140 and the connection blocks 100a and 100b in the gun housing, in the material mixing and dispensing position. In this position, the connection block ports 120a and 120b line up with the respective injection ports 230 and 240 so the fluid components are able to pass through to the impingement mixing chamber 250 at the center.

Figure 14:
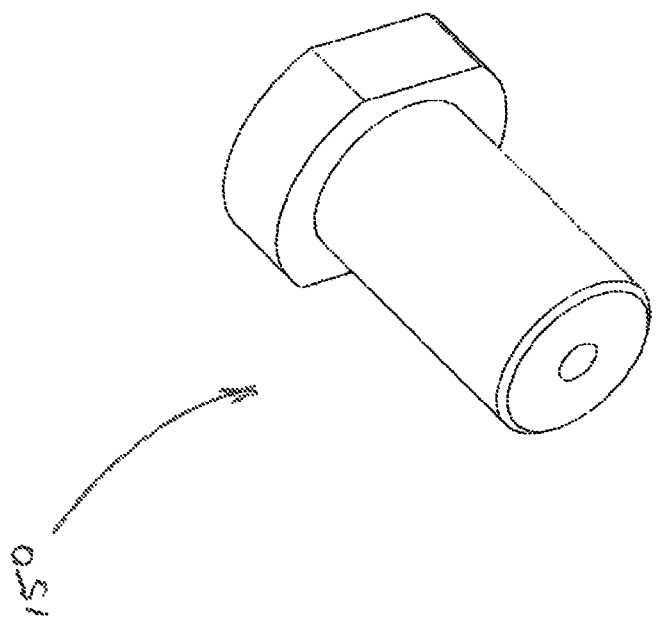
FIG. 14 is a perspective view of the preferred backpressure element of FIG. 7.

FIG. 14 is a perspective view of the preferred backpressure element 150.

Figure 15:
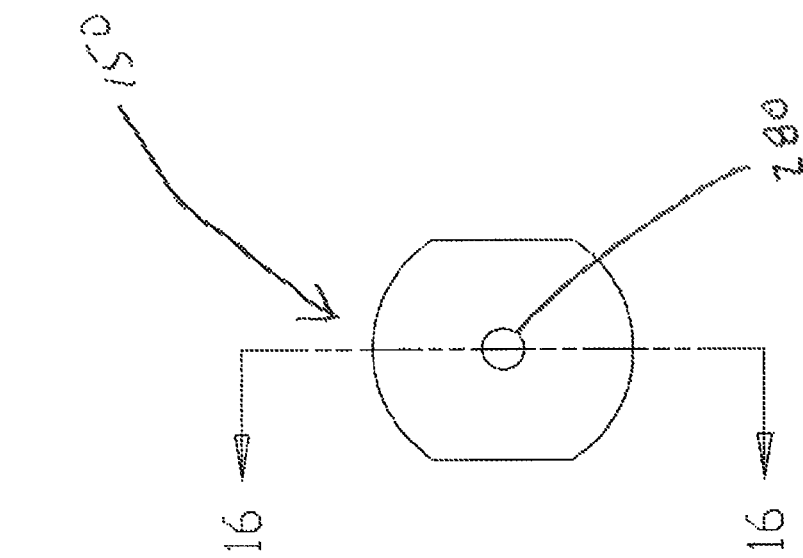
FIG. 15 is a front view of the preferred backpressure element of FIGS. 7 and 14.

FIG. 15 is a front view of the preferred backpressure element 150. The backpressure port 280 in the preferred embodiment has a diameter of approximately 0.060 inches (0.15 cm).

Figure 16:
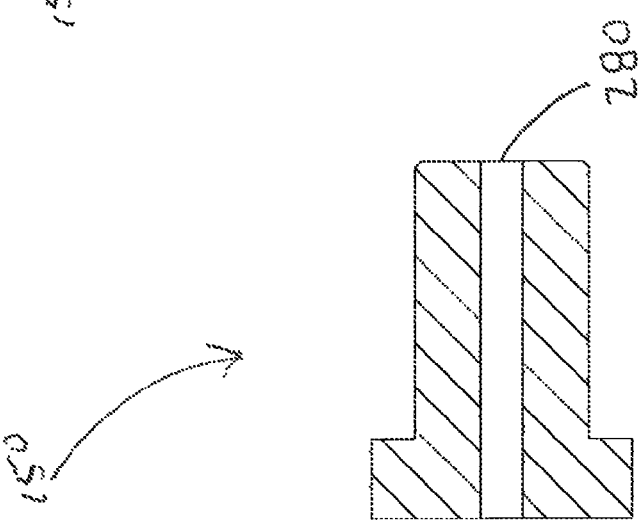
FIG. 16 is a cross-sectional side view of the preferred backpressure element of FIGS. 7 and 14, taken at the vertical plane and in the direction indicated by line 16-16 of FIG. 15.

FIG. 16 is a cross-sectional side view of the preferred backpressure element 150.

Figure 17:
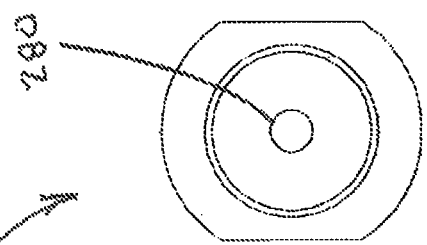
FIG. 17 is a rear view of the preferred backpressure element of FIGS. 7 and 14.

FIG. 17 is a rear view of the preferred backpressure element 150.

Figure 18:
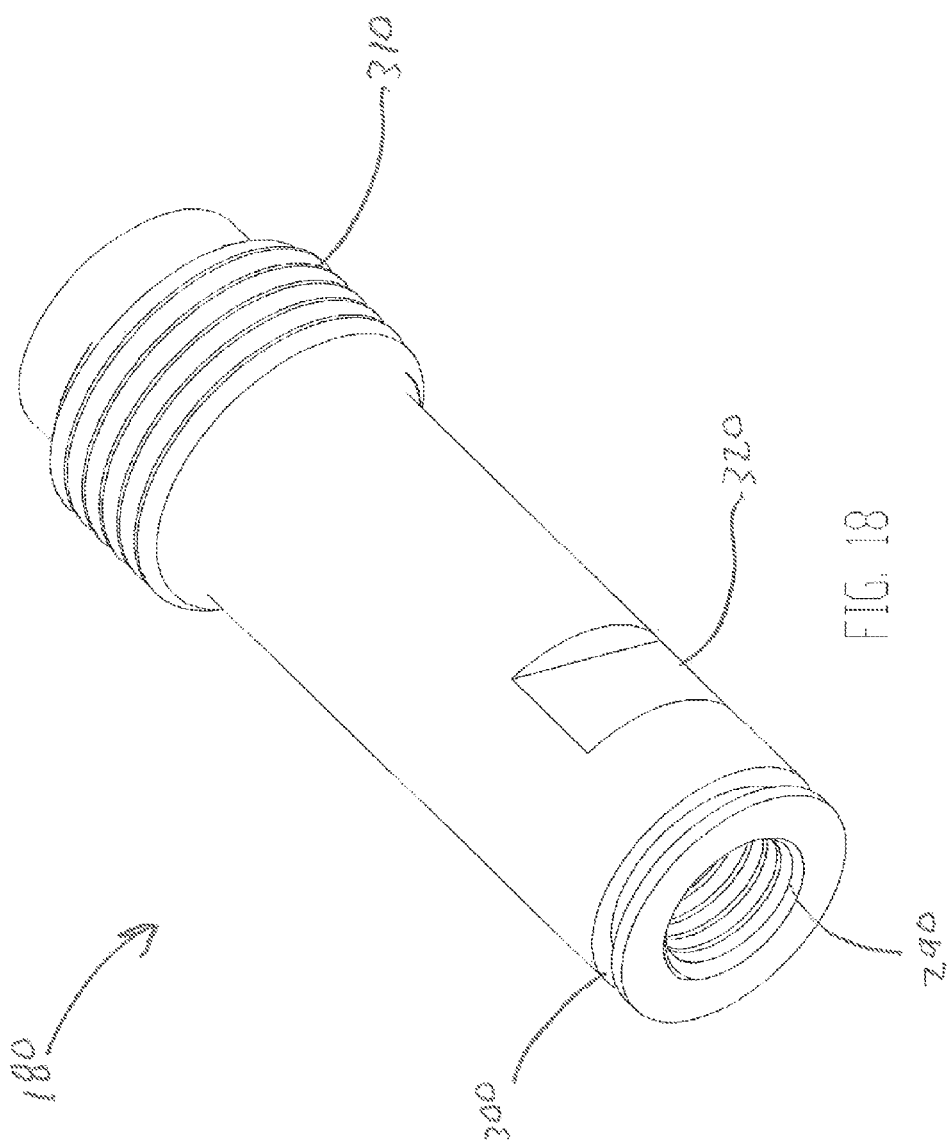
FIG. 18 is a perspective view of the preferred static mixer housing of FIG. 7.

FIG. 18 is a perspective view of the preferred static mixer housing 180 that connects via a thread 290 to the matching thread 220 on the front end of the impingement mixing element 140. There is an O-ring groove 300 to accommodate the O-ring 170 and a pair of wrench slots 320, of which only one can be seen in this view with the other one being on the opposite side. These wrench slots are to facilitate quick and easy removal of the static mixer housing 180 from the impingement mixing element 140.

FIG. 19 is a rear view of the preferred static mixer housing 180 showing the rear end internal thread 290 that connects to a matching thread 220 on the front end of the impingement mixing element 140. This drawing also shows the larger diameter external thread 310 that the spraying orifice 200 screws onto.

FIG. 20 is a cross-sectional side view of the preferred static mixer housing 180. The long 0.250 inch (0.635 cm) diameter bore 330 is stepped down to a smaller bore 340 which acts as a step to prevent the static mixer element 190 from being inserted too far. In this preferred embodiment, the spraying orifice 200 when screwed onto the front end of the static mixer housing prevents the static mixing element from being moved downstream by the fluid.

FIG. 21 is a front view of the preferred static mixer housing 180 showing the external thread 310 and the internal bores 330 and 340 more clearly.

The pressures of the respective fluid components should be a minimum 1,000 psi (7,000 kPa) to ensure it is sufficient to cause atomization and formation of an acceptable spray pattern upon exit of the mixed material from the spray orifice 200, efficient operation of the overall system 10 and sufficient pressure for effective initial mixing in the impingement mixing element 140. The invention has however been successfully practiced at pressures as low as 300 psi (2,000 kPa). Conversely, the maximum preferred pressure is 3,500 psi (24,000 kPa) to minimize equipment wear and maximize safety although the invention can work at much higher pressures such as the 7,000-10,000 psi (50,000-70,000 kPa) that current high pressure spray systems operate at. There is no special need to match the respective fluid component pressures although it is preferable to keep the difference in pressures between respective fluid components within 1,000 psi (7,000 kPa).

The volumetric proportioning ratios between the respective fluid components can range from 1:1 to as much as 10:1 without great difficulty for a two component formulation. Much higher ratio differences for plural component systems are also manageable such as where catalyst, blowing agents, pigments and/or other components are included in the formulation, without needing to pre-blend them into one of the larger proportion components. For example, a 5:1 system with an additional catalyst fed in at minute levels such as a few parts per million is manageable.

Large differences in viscosities between the respective fluid components of a plural component formulation are managed through one or more of the following means: the higher viscosity fluid components are heated to reduce the viscosity such that the fluid can be pumped through the system, with the upper limit on viscosity being that which causes the proportioning pumps 40 and 50 to reach the upper pressure or power limit; hose or tubing sizes for the higher viscosity fluid components are increased relative to the sizes for the lower viscosity fluid components; hose or tubing sizes for the lower viscosity fluid components are decreased relative to the sizes for the higher viscosity fluid components; the injection port 240 in the impingement mixing element 140 that corresponds to the higher viscosity fluid component(s) has its size increased relative to the injection port 230 for the lower viscosity fluid component(s) in the cases where higher viscosity corresponds to higher side of the proportioning ratio; the pressure of the higher viscosity fluid component is increased relative to the pressure of the lower viscosity fluid component. It is preferred to have the ability to heat the respective individual fluid components to different temperatures and maintain uniform temperatures throughout the system by the addition of hose heating, etc., where required.

Special care and attention is required to ensure the mixing and spraying apparatus 80 is properly configured for good spraying results. The respective fluid components entering the mixing and spraying apparatus through the injection ports 230 and 240 of the impingement mixing element 140 need to make contact with each other and the various surfaces of the impingement mixing chamber 250 of the impingement mixing element 140 in such a way as to create sufficient turbulence to begin the mixing process. The backpressure element 150 needs to provide enough backpressure to aid in this mixing and to prevent lower viscosity fluid component(s) from over-running the higher viscosity fluid component(s). Too much backpressure will cause problems such as preventing enough mixed fluid to exit the spray orifice 200 to establish a good spray pattern and/or cause fluid mixing and clogging in one or more of the injection ports 230 and 240. The injection ports can be larger in diameter and have much greater cross-sectional area than the backpressure element 150 in the case of high viscosity fluids, particularly where there is a large proportioning ratio difference with the higher viscosity fluid component also being on the higher proportion side of the ratio. The injection ports 230 and 240 have offsets from the centerline of the impingement mixing element 140 impingement mixing chamber 250 to promote some swirling, albeit rather turbulently, of the fluid components as they enter the impingement mixing element 140 through the respective injection ports 230 and 240 and begin moving downstream toward the static mixer housing 180. The fluid components are only partially mixed by the time this partially mixed material moves downstream from the impingement mixing element 140. A preferred form and location of the backpressure element 150 is as an insert that fits into the impingement mixing element and is fastened into place by screwing the static mixer housing 180 containing one or more static mixer elements 190 onto the end of the impingement mixing element 140, thereby securing the backpressure element 150 in place. A washer 160, preferably made of nylon or another suitable material, may also be inserted between the backpressure element 150 and static mixer housing 180 although this is not an essential requirement. Including a washer 160 helps to prevent fluid leakage and dampen any potential vibration of either the impingement mixing element 140 or backpressure element 150 relative to the static mixer housing 180.

The static mixer housing 180 should be able to be quickly and easily removed so that it can be exchanged for another, or have the static mixer element(s) 190 removed and replaced. The preferred method is to use cylindrical disposable plastic elements that are inexpensive and can be easily drilled out using a hand drill or a drill press. They can also be pressed out or cooked out although the drilling method is preferred. One or more static mixing elements can be used with varying geometries suited to the materials being mixed. The selection of static mixer elements also affects the backpressure such that there may be a need to increase or decrease it by varying the size of the backpressure element 150. Similarly, the size of the spraying orifice 200 can influence the sizing of the backpressure element 150.

The preferred spraying orifice 200 is the popular and commonly available reversible tip 210 style that can be easily and inexpensively obtained from many hardware stores and suppliers of spraying equipment. Tip sizes vary as do the spray pattern options. The spraying orifice 200 is attached to the static mixer housing 180 via a threaded connection 310. Another preferred option is to use an injection or pouring nozzle type of spraying orifice 200 where it is not desired to atomize the material. This is often the case where molds or cracks need to be filled.

The backpressure element 150, static mixing element(s) 190 and spraying orifice 200 need to be reasonably well matched to sufficiently obstruct the downstream flow from the point along the impingement mixing element 140 at which the injection ports 230 and 240 are located and the initial impingement mixing takes place in the impingement mixing chamber 250, to provide for thorough mixing of the fluid components by the time the mixed material is dispensed from the mixing and spraying apparatus 80. The combined obstruction is important, perhaps essential to creating adequate mixing of the material. However, the combined obstruction must not be too great. Too much obstruction will result in material backing up into one or more of the inlet ports 230 and 240, insufficient flow rates through the spraying orifice 200 and/or an inadequate spray pattern.

A suitable amount of obstruction can be reasonably achieved by someone of ordinary skill in the art by selecting a suitable size spray tip 210, suitable static mixing element(s) 190 and a suitably sized backpressure element 150. It may require some simple tests to work out a good combination of these elements for a particular formulation. Similarly, it may require some trial and error or other simple tests to establish the correct port sizes for the impingement mixing element 140, plus suitable system operating temperatures and pressures for a particular formulation. Plural component spraying systems have historically tended to be rather tricky to get working well enough to achieve consistent good results without persistent clogging, equipment problems, mixing problems or glitches in the mixed material as it is being sprayed. Some difficulties in properly configuring a system to match a formulation is normal and expected although these difficulties are expected to diminish quickly once the parameters for a particular formulation are initially worked out.

The following paragraphs are intended to help the practitioner select suitable elements and sizes, and set operating parameters to provide for good spraying results. Establishing the right degree of mixing in the impingement mixing element 140 and a suitable amount of obstruction in the mixing and spraying apparatus 80 is important so further guidance is being provided for setting the temperatures and pressures of the spraying system 10, plus the dimensions of injection ports 230 and 240, etc.

For setting the system temperatures, one must consider the temperature limits of the formulation and not exceed the temperature recommended by the formulation manufacturer or supplier to prevent overheating one or more of the fluid components of the formulation. Typically, temperatures are limited to approximately 210 degrees F. (100 degrees C.) for many formulations, although there are some that are limited to maximum temperatures that are considerably lower than that. A minimum practical temperature is 55 degrees F. (15 degrees C.). Hot spots within the system which may cause localized overheating of one or more of the fluid components should also be avoided. It is recommended that the temperature setting be at least a few degrees below the maximum temperature limit. In practice, the preferred heating temperatures tend to be in a range from 65 to 200 degrees F. (18 to 95 degrees C.).

To set the temperatures, the preferred procedure is to first set the temperature of the highest viscosity fluid component a few degrees lower than the maximum temperature limit. On plural component pump systems where there is the ability to individually control the respective fluid component temperatures, the temperatures of the lower viscosity fluid components should be set to where the viscosity matches most closely that of the higher temperature fluid component. On plural component pump systems that do not have individual temperature control for the respective fluid components, the lower viscosity fluid components will not likely have viscosities matched to the higher viscosity ones. This should not be a big problem because the present invention allows for large differences in viscosities between the respective fluid components. However, if there is a problem achieving good mixing due to the viscosities being too far apart, one should try operating the system at lower overall temperature before seeking another pump system with individual temperature control. Including heating along the length of hose, tubing and/or piping is desirable and preferred.

The plural component proportioning pump system pressure should be set such that the maximum pressure never exceeds the maximum pressure capability of the equipment as determined by the equipment supplier or manufacturer. These maximum pressure limits vary greatly depending on the equipment package. Typically they are in the range from 3000 to 8000 psi (20,000 to 55,000 kPa) for the type of plural component systems presently in use. Some systems have higher maximum operating pressures. The preferred approach is to set the system pressure at approximately 2,000 to 3,000 psi (15,000 to 20,000 kPa). Pressures are generally not individually controllable on plural component proportioning pump systems because the volumetric ratios are locked such that the fluid component that has the greatest resistance downstream at any given instant governs the pump system pressure. The pressure of the respective fluid components do not need to be matched but the pressure of the lowest pressure fluid component when operating should be high enough to ensure adequate mixing takes place. Since the impingement mixing depends on pressure to create suitable mixing, the preferred minimum pressure on any fluid component is 1,000 psi (7,000 kPa). Lower pressures also work in some instances. The minimum pressure also needs to be high enough that a suitable spray pattern is achieved as the mixed material exits the spraying orifice 200. However, there are some dispensing type orifices such as pouring, crack-filling or mold-filling nozzles that do not require nearly as much pressure to operate as do spraying orifices requiring airless atomization. Air-assisted spraying orifices also generally do not require as much pressure as the airless type. The preference is to operate with a minimum and maximum pressure of 1,000 psi (7,000 kPa) and 3,000 psi (21,000 kPa) respectively. The difference in pressures between the respective fluid components do not need to be matched but it is preferred that this differential is kept to a minimum, preferably less than 1,000 psi (7,000 kPa). Adjusting the temperatures upward or downward for the respective fluid components can have dramatic effects on pressure so it is important to maintain temperatures to avoid radical pressure fluctuations during mixing and dispensing operations. Higher pressure systems tend to be costly and also more expensive to operate. Safety also becomes more of an issue for equipment operating at higher pressures.

If highly viscous fluids are involved, the system pressures may need to be increased to ensure sufficient flow and delivery to the spray gun. Pressures might need to approach 7,000 psi (50,000 kPa) or higher for formulations with one or more fluid components with viscosity greater than 1,000,000 cP. In general, however, the required pressures tend to be lower in the system of the present invention in comparison to a traditional solvent flush system used to mix and dispense such a formulation.

Another variable is the size and length of hose, tubing or piping between the proportioning pumps 40 and 50 and spray gun 60. The diameters need to be large enough to allow for the viscous fluids to travel the length of hose and/or tubing. The preference is to use the smallest size that will allow for sufficient fluid flow for each respective component but this is not an essential requirement. Sizes are typically in the range of ¼ inch to ½ inch (0.6 cm to 1.3 cm) nominal diameter for hand-held spray guns at lengths of 50 to 500 feet (15 m to 150 m). However, in-plant systems often use much larger diameter up to 2 inches (5 cm) or more and sometimes possibly longer lengths. For example, a manufacturing plant can have a system to feed multiple orifices from one set of proportioning pumps, therefore requiring the larger piping sizes.

The preferred procedure for sizing the injection ports 230 and 240 in the impingement mixing element 140 of the preferred embodiment is relatively straight forward. The relative pressures of the respective fluid components serve as a guide to sizing these respective ports. The starting point is for a matched viscosity 1:1 ratio set of fluid components. In this case, the injection ports 230 and 240 can be the same size and starting at a relatively small diameter of 0.040 inches (0.10 cm). The pressures should be close to matched in this case. Where one of the 1:1 proportion fluid components has a much higher viscosity than the other, the port corresponding to the higher viscosity fluid component should have its size increased until the relative pressures are within approximately 1,000 psi (7,000 kPa) of each other. Similarly, where the proportioning ratio differs, the port corresponding to the higher side of the ratio should have its size increased until the relative pressures are within approximately 1,000 psi (7,000 kPa) of each other. The maximum port size is approximately 0.100 inches (0.25 cm) in diameter.

The sizing of the impingement mixing chamber 250 is not normally varied in this preferred embodiment from the preferred 0.069 inches (0.18 cm) diameter although it can be varied if needed to match desired production output volumes. The chamber should be kept as small as possible to minimize the amount of mixed material that needs to be cleared out of the mixing and spraying apparatus 80 at the end of each operating cycle for a given production output volume. If it is too small, there will be insufficient flow of mixed material exiting the spraying orifice 200 to meet desired production output volumes. The 0.069 inch (0.18 cm) diameter impingement mixing chamber 250 is well matched to suit the standard off the shelf spraying orifices 200 and tips 210 commonly commercially available. Preferred tips 210 come in a range of sizes with 0.015 to 0.050 inches (0.038 to 0.13 cm) being preferred. These commonly available tips 210 also come in different spray pattern widths and geometries. As stated earlier, the amount of offset between the centerline of the injection ports 230 and 240 and the center of the impingement mixing chamber 250 is preferred at approximately 0.042 inches (0.11 cm). There can be some variation in the amount of offset which accommodates the range of injection port sizes without the injection ports missing the chamber when bored through to the center of the impingement mixing element 140. Too much offset will also interfere with the fluid component connection blocks 100*a* and 100*b* that need to press tightly against the sides of the impingement mixing element 140 to maintain an effective fluid seal.

The backpressure element 150 can be placed anywhere between the impingement mixing chamber 250 and the spraying orifice 200 although the preference is to have it inserted between the impingement mixing element 140 and static mixer housing 180 as has been done in this preferred embodiment. The diameter of the backpressure element orifice 280 in the preferred embodiment is approximately 0.060 inches (0.15 cm) which is increased to approximately 0.069 inches (0.18 cm) for higher viscosity fluids. The distance from the impingement mixing chamber 250 through the backpressure element 150 to the input side of the static mixer housing 180 where first contact is made with the static mixing element(s) 190 is minimized to again minimize the amount of mixed material that needs to be cleared out of the mixing and spraying apparatus 80 at the end of each operating cycle. In the preferred embodiment shown, this distance is approximately 1 inch (2.5 cm).

The length of the static mixer housing 180 and its related static mixing element(s) 190 is the shortest length needed to provide adequate mixing. It is kept to a minimum to minimize the amount of mixed material that needs to be cleared out of the mixing and spraying apparatus 80 at the end of each operating cycle. The static mixer housing 180 has a nominal ¼ inch (0.63 cm) diameter and holds disposable plastic elements 190 that, in the preferred embodiment, are configured with ¼ inch long segments or "turns" with each segment making a turn within the static mixer housing 180. These are readily available from various suppliers of spraying equipment. The static mixing elements 190 are made from various plastic materials such as high density polyethylene or nylon that are easily drilled out when sufficient mixed material has built up to impede the flow rates to the extent that the system becomes inoperable. The static mixers used in the preferred embodiment are the following ones identified by the number of turns: 4 turn, 6 turn, 8 turn, 10 turn and 12 turn. Selecting the appropriate one for a given formulation is a simple matter of starting with the shortest one, checking the mixing quality and increasing to the next longer one until a satisfactory degree of mixing has been achieved. The quality of mixing is easily determined by testing the physical properties of the finished cured material. There is no harm in having a few more turns than required although the longer ones require more effort to drill out than the shorter ones, plus the longer ones slightly increase the weight and size of the spray gun 60 which is generally not desirable. The preference is to minimize the size and weight of the gun. The shorter mixers also help to increase the effectiveness of any air purge.

The overall length of the portion of the mixing and spraying apparatus 80 that contains any mixed material is approximately 4+/−2 inches (10+/−5 cm).

A series of experimental trials were conducted using the Roosen '490 plasticized gypsum composition and the details that appear below with respect to refinements to the present invention that were made to accommodate the Roosen '490 formulations serve to illustrate a very specific preferred embodiment of the present invention. It is important to note that there are a great many formulations and variations within them, thousands, and perhaps tens or hundreds of thousands of them, that the present invention can accommodate so this particular formulation and the variations within it that were used for the experimental trials and form the basis of describing this preferred embodiment represents a rather specific and narrow view of the invention.

The initial Roosen '490 formulation that was introduced into the experimental trials of the present invention is a two part plural component formulation with gypsum, the dihydrate form of calcium sulphate, as the main ingredient by weight. It is most simply described as a two part polyurethane with part A representing the liquid gypsum containing polyol side and part B being a conventional liquid isocyanate, a polymeric diphenylmethane diisocyanate commonly referred to as MDI in the industry. In particular, the MDI used for these trials was a product currently produced by the Dow Chemical Company under the trade name PAPI-27. In the descriptions to follow, the variations in the formulations used in the experimental trials will be identified by the weight percentage of gypsum in the respective formulation beginning with the initial "41-42% PBW Gypsum," meaning a formulation which contains 41 to 42 percent (parts by weight) gypsum. As the trials continued, the level of gypsum was increased up to a "62-65% PBW Gypsum" formulation, meaning 62 to 65 percent (parts by weight) gypsum. The means by which the formulations were altered throughout the trials were simply by way of addition of additional amounts of dry gypsum powder to the part A fluid component.

The initial Roosen '490 formula (41-42% PBW Gypsum) used for the trials had the respective part A and part B fluid component compositions as follows:

41-42% PBW Gypsum formulation:
Part A Fluid Component:

| | |
|---|---|
| Gypsum | 48.95% PBW of Part A |
| Castor Oil | 45.33% PBW of Part A |
| Titanium Dioxide | 3.16% PBW of Part A |
| Iron Oxide (black) | 1.36% PBW of Part A |
| Synthetic Zeolite | 1.20% PBW of Part A |

Part B Fluid Component:

| | |
|---|---|
| Dow PAPI-27 MDI | 100% PBW of Part B |

The combined formulation has the optimum ratio of part A to part B as 5:1 PBW or 83:17 PBW although there is a range of 80:20 PBW to 85:15 PBW within which there is adequate curing of the mixed material, notwithstanding significant variations in properties throughout this range. Gravimetric ratios need to be translated to volumetric ratios for use with the proportioning pumps. For the purposes of these trials, two volumetric ratios were selected as follows:
4.66:1 (part A to part B) PBV (parts by volume) and
5.00:1 (part A to part B) PBV (parts by volume).

The ratios were reconfigured manually by exchanging the pistons and cylinders on the hydraulically driven ratio proportioning unit 40 and 50. The 4.66:1 PBV ratio was to be used for the lower percentage gypsum formulations and changed to 5.00:1 for higher percentage gypsum formulations. As the percentage gypsum was increased, due to it being added to the part A fluid component, the gravimetric ratio and volumetric ratios needed to be increased to effectively cure the mixed materials with suitable physical properties.

There was a blend of 40% ethanol and 60% water used as a blowing agent added to the part A fluid component for some of the trials. There was also a curing agent (catalyst/accelerator) in the form of dibutyltindilaurate (DBTL) added to the part A fluid component for some of the trials. The amounts of either an added blowing or curing agent never exceeded 0.25% PBW for these trials.

The respective impingement mixing element 140 injection port 240 and 230 diameters were 0.093+/−0.002 inches (0.236+/−0.005 cm) for the part A injection port 240 and 0.043+/−0.002 inches (0.109+/−0.005 cm) for the part B injection port 230. The diameter of the impingement mixing chamber 250 was 0.069+/−0.001 inches (0.175+/−0.003 cm). The nominal hose sizes for the part A and part B fluid components respectively were 50 feet (15 m) of ½ inch (1.3 cm) and ⅜ inch (1.0 cm) with ¼ inch (0.6 cm) whip hoses for the 10 feet (3 m) nearest the spray gun 60 except for the 62-65% PBW Gypsum trials for which the part B line was reduced to ¼ inches (0.6 cm) throughout. There was a total 60 feet (20 m) of hose length from the pumps to the gun. Static mixer housing bore 330 size is nominally ¼ inch (0.6 cm) diameter with the static mixing elements 190 being snugly fit into the static mixer housing 180 by pushing them in manually. The static mixer housing 180 holds disposable plastic elements 190 that, in the preferred embodiment, are configured with ¼ inch long segments or "turns" with each segment making a turn within the static mixer housing 180.

The equipment configuration, formulation and process details that were varied for the trials were as follows:

| 41-42% PBW Gypsum | |
|---|---|
| Proportioning pumps 40 and 50 ratio | 4.66:1 PBV |
| Spraying orifice tip 210 diameter | 0.025 inches (0.064 cm) |
| Backpressure element bore 280 diameter | 0.060 inches (0.152 cm) |
| Static mixer element 190 no. of turns | 8 turns |
| Pressure part A at pump 40 | 1000 +/− 100 psi (7 MPa) |
| Pressure part B at pump 50 | 1000 +/− 100 psi (7 MPa) |
| Temperature part A | 115 degrees F. (46 C.) |
| Temperature part B | 115 degrees F. (46 C.) |
| Ambient Temperature | 90 degrees F. (32 C.) |
| Hardness after 24 hours at 75 degrees F. | Shore D40 |
| Blowing agent (percent by weight) | nil |
| Accelerator (DBTL) (percent by weight) | nil |
| Cure time until measurable hardness | 2 hours |
| Specific Gravity (s.g) | 1.2-1.4 |

Description of Application:
0.020 to 0.030 inch (0.05 to 0.08 cm) thick coating on steel plate.
Observations:
Smooth coating of uniform thickness and appearance.

| 41-42% PBW Gypsum | |
| --- | --- |
| Proportioning pumps 40 and 50 ratio | 4.66:1 PBV |
| Spraying orifice tip 210 diameter | 0.021 inches (0.053 cm) |
| Backpressure element bore 280 diameter | 0.069 inches (0.175 cm) |
| Static mixer element 190 no. of turns | 12 turns |
| Pressure part A at pump 40 | 1850 +/− 100 psi (13 MPa) |
| Pressure part B at pump 50 | 1850 +/− 100 psi (13 MPa) |
| Temperature part A | 140 degrees F. (60 C.) |
| Temperature (Hoses A & B) | 135 degrees F. (57 C.) |
| Temperature part B | 90 degrees F. (32 C.) |
| Ambient Temperature | 90 degrees F. (32 C.) |
| Hardness after 24 hours at 75 degrees F. | Shore D40 |
| Blowing agent (percent by weight) | nil |
| Accelerator (DBTL) (percent by weight) | nil |
| Cure time until measurable hardness | 2 hours |
| Specific gravity (s.g.) | 1.2-1.4 |

Description of Application:
0.010 to 0.020 inch (0.03 to 0.05 cm) thick coating on steel plate.
Observations:
Smooth coating of uniform thickness and appearance.

| 41-42% PBW Gypsum | |
| --- | --- |
| Proportioning pumps 40 and 50 ratio | 4.66:1 PBV |
| Spraying orifice tip 210 diameter | 0.031 inches (0.078 cm) |
| Backpressure element bore 280 diameter | 0.060 inches (0.152 cm) |
| Static mixer element 190 no. of turns | 8 turns |
| Pressure part A at pump 40 | 1600 +/− 200 psi (11 MPa) |
| Pressure part B at pump 50 | 1000 +/− 200 psi (7 MPa) |
| Temperature part A | 150 degrees F. (66 C.) |
| Temperature part B | 105 degrees F. (41 C.) |
| Temperature (Hoses A & B) | 145 degrees F. (63 C.) |
| Ambient Temperature | 100 degrees F. (38 C.) |
| Hardness after 24 hours at 75 degrees F. | Shore D40 |
| Blowing agent (percent by weight) | nil |
| Accelerator (DBTL) (percent by weight) | 0.20% |
| Cure time until measurable hardness | 8 seconds |
| Specific gravity (s.g.) | 1.2 |

Description of Application:
¼ to ¾ inch (0.6 to 1.9 cm) thick slabs—single coat application.
Observations:
Smooth finish with excellent flexibility and appearance.

| 41-42% PBW Gypsum | |
| --- | --- |
| Proportioning pumps 40 and 50 ratio | 4.66:1 PBV |
| Spraying orifice tip 210 diameter | 0.025 inches (0.064 cm) |
| Backpressure element bore 280 diameter | 0.060 inches (0.152 cm) |
| Static mixer element 190 no. of turns | 8 turns |
| Pressure part A at pump 40 | 1000 +/− 100 psi (7 MPa) |
| Pressure part B at pump 50 | 1000 +/− 100 psi (7 MPa) |
| Temperature part A | 135 degrees F. (57 C.) |
| Temperature part B | 90 degrees F. (32 C.) |
| Ambient Temperature | 90 degrees F. (32 C.) |
| Hardness after 24 hours at 75 degrees F. | Shore D40 |
| Blowing agent (percent by weight) | nil |
| Accelerator (DBTL) (percent by weight) | <0.07% |
| Cure time until measurable hardness | 20 minutes |
| Specific Gravity (s.g) | 1.2-1.4 |

Description of Application:
0.020 to 0.030 inch (0.05 to 0.08 cm) thick coating on steel plate.
Observations:
Smooth coating of uniform thickness and appearance.

| 50% PBW Gypsum | |
| --- | --- |
| Proportioning pumps 40 and 50 ratio | 4.66:1 PBV |
| Spraying orifice tip 210 diameter | 0.031 inches (0.078 cm) |
| Backpressure element bore 280 diameter | 0.060 inches (0.152 cm) |
| Static mixer element 190 no. of turns | 8 turns |
| Pressure part A at pump 40 | 1000 +/− 100 psi (7 MPa) |
| Pressure part B at pump 50 | 900 +/− 100 psi (6 MPa) |
| Temperature part A | 150 degrees F. (66 C.) |
| Temperature part B | 105 degrees F. (41 C.) |
| Temperature (Hoses A & B) | 145 degrees F. (63 C.) |
| Ambient Temperature | 105 degrees F. (41 C.) |
| Hardness after 24 hours at 75 degrees F. | Shore D45 |
| Blowing agent (percent by weight) | nil |
| Accelerator (DBTL) (percent by weight) | 0.07% |
| Cure time until measurable hardness | 30 seconds |
| Specific gravity (s.g.) | 1.2-1.4 |

Description of Application:
⅜ inch (1 cm) thick slab—single coat application.
Observations:
Smooth finish with excellent flexibility and appearance.

| 50% PBW Gypsum | |
| --- | --- |
| Proportioning pumps 40 and 50 ratio | 4.66:1 PBV |
| Spraying orifice tip 210 diameter | 0.031 inches (0.078 cm) |
| Backpressure element bore 280 diameter | 0.060 inches (0.152 cm) |
| Static mixer element 190 no. of turns | 8 turns |
| Pressure part A at pump 40 | 1000 +/− 100 psi (7 MPa) |
| Pressure part B at pump 50 | 900 +/− 100 psi (6 MPa) |
| Temperature part A | 150 degrees F. (66 C.) |
| Temperature part B | 105 degrees F. (45 C.) |
| Temperature (Hoses A & B) | 150 degrees F. (66 C.) |
| Ambient Temperature | 105 degrees F. (45 C.) |
| Hardness after 24 hours at 75 degrees F. | Shore D40 |
| Blowing agent (percent by weight) | 0.25% |
| Accelerator (DBTL) (percent by weight) | 0.20% |
| Cure time until measurable hardness | 1 minute |
| Specific gravity (s.g.) | 0.7 to 0.8 |

Description of Application:
1 inch (2.5 cm) thick slab—single coat application.
Observations:
Smooth finish with excellent flexibility and appearance.

| 50-55% PBW Gypsum | |
| --- | --- |
| Proportioning pumps 40 and 50 ratio | 4.66:1 PBV |
| Spraying orifice tip 210 diameter | 0.031 inches (0.078 cm) |
| Backpressure element bore 280 diameter | 0.060 inches (0.152 cm) |
| Static mixer element 190 no. of turns | 6 turns |
| Pressure part A at pump 40 | 1000 +/− 100 psi (7 MPa) |
| Pressure part B at pump 50 | 800 +/− 100 psi (5.5 MPa) |
| Temperature part A | 150 degrees F. (66 C.) |
| Temperature part B | 120 degrees F. (49 C.) |
| Temperature (Hoses A & B) | 150 degrees F. (66 C.) |
| Ambient Temperature | 100 degrees F. (38 C.) |
| Hardness after 24 hours at 75 degrees F. | Shore D45 |
| Blowing agent (percent by weight) | trace |
| Accelerator (DBTL) (percent by weight) | 0.20% |
| Cure time until measurable hardness | <1 minute |
| Specific gravity (s.g.) | 0.95 to 1.05 |

Description of Application:
Molded shingle (¼ to 1 inch (0.5 to 2.5 cm) thick)—single application.
Observations:
Excellent flexibility, finish and appearance.

| 60-62% PBW Gypsum | |
|---|---|
| Proportioning pumps 40 and 50 ratio | 5.00:1 PBV |
| Spraying orifice tip 210 diameter | 0.031 inches (0.078 cm) |
| Backpressure element bore 280 diameter | 0.060 inches (0.152 cm) |
| Static mixer element 190 no. of turns | 10 turns |
| Pressure part A at pump 40 | 2000 +/− 100 psi (14 MPa) |
| Pressure part B at pump 50 | 1200 +/− 100 psi (8 MPa) |
| Temperature part A | 167 degrees F. (75 C.) |
| Temperature part B | 119 degrees F. 49 C.) |
| Temperature (Hoses A & B) | 150 degrees F. (66 C.) |
| Ambient Temperature | 110 degrees F. (43 C.) |
| Hardness after 24 hours at 75 degrees F. | Shore D55 |
| Blowing agent (percent by weight) | trace |
| Accelerator (DBTL) (percent by weight) | 0.20% |
| Cure time until measurable hardness | 30 seconds |
| Specific gravity (s.g.) | 0.95 to 1.05 |

Description of Application:
Molded shingle (¼ to 1 inch (0.5 to 2.5 cm) thick)—single application.
Observations:
Excellent flexibility, finish and appearance.

| 62-65% PBW Gypsum | |
|---|---|
| Proportioning pumps 40 and 50 ratio | 5.00:1 PBV |
| Spraying orifice tip 210 diameter | 0.031 inches (0.078 cm) |
| Backpressure element bore 280 diameter | 0.069 inches (0.175 cm) |
| Static mixer element 190 no. of turns | 6 turns |
| Pressure part A at pump 40 | 2000 +/− 200 psi (14 MPa) |
| Pressure part B at pump 50 | 1100 +/− 200 psi (7.5 MPa) |
| Temperature part A | 174 degrees F. (79 C.) |
| Temperature part B | 119 degrees F. (49 C.) |
| Temperature (Hoses A & B) | 150 degrees F. (66 C.) |
| Ambient Temperature | 115 degrees F. (46 C.) |
| Hardness after 24 hours at 75 degrees F. | Shore D50 (D55 @ 7 days) |
| Blowing agent (percent by weight) | 0.10% |
| Accelerator (DBTL) (percent by weight) | 0.15% |
| Cure time until measurable hardness | 30 sec (45 sec to demold) |
| Specific gravity (s.g.) | 0.95 |

Description of Application:
Molded shingle (¼ to 1 inch (0.5 to 2.5 cm) thick)—single application.
Observations:
Excellent flexibility, finish and appearance.

The quality of mixing was determined to be remarkably high with few or no striations, blemishes, or laminations in the samples made. The ability to successfully spray at the higher levels of gypsum, greater than 50% PBW Gypsum, was an unexpected and extraordinary result. At the elevated temperatures, the viscosity of the 62-65% PBW Gypsum part A fluid component was approximately 100,000 cP (centipoises) while the part B fluid component was approximately 100 cP, the former being approximately 1,000 times greater than the latter. What was also completely unexpected is that the surface finish of the higher gypsum produced pieces was as good as and sometimes better than that of the lower gypsum ones. The spray pattern was also as good and sometimes a little bit better in the case of the higher gypsum trials. While not wishing to be bound to any particular theory, it is the applicants' belief that this is caused by the higher gypsum material having both greater density and greater specific heat capacity during the initial curing, causing a more even curing characteristic, especially so when foamed products were being made. The applicants are continuing to explore reasons for these unexpected results.

The applicants believe the reasons for the excellent quality mixing achieved during these trials, notwithstanding the simultaneous greatly divergent viscosities and proportioning ratios of the respective fluid components, has its root in a combination of fluid dynamic, mechanic and thermodynamic effects along with chemical reaction dynamics that are well enough understood that a reasonable explanation and theory can be advanced herein. Advanced computational fluid dynamic (CFD) analysis combined with analysis of the simultaneously varying chemistry and physics related thereto during the movement of the fluids would be expected to provide further insight into this area. However, the applicants again do not wish to be bound to a particular theory, but offer the following explanation in an attempt to aid a person or persons or ordinary skill in the art to be able to practice the invention without much difficulty or the need to conduct more than some simple testing.

The fluid components entering the impingement mixing element 140 through the respective injection ports 230 and 240 are doing so under high pressures, velocities and temperatures. They are forced into a small impingement mixing chamber 250 where they initially come into contact in a somewhat turbulent manner. There is backpressure caused by a combination of the combined fluids being forced through the backpressure element 150 plus the other elements downstream 180, 190 and 200 produce the net amount of backpressure. The backpressure, although not great enough to cause the fluids to become forced to backup through one or more of the injection ports 230 and 240, is great enough to effectively form an obstruction that prevents the fluids from exiting the initial impingement mixing area too quickly or easily and serves to further increase the amount of energy that is imputed into the fluids. This causes more localized heating of the fluids providing enough kinetic energy to greatly accelerate the rate of chemical reactions that are required to cause the fluid components to combine chemically and polymerize. The accelerated heating further increases the exothermic chemical reactions, thereby creating more heat. The cycle continues but not to the extent that the fluids become cured solids before they have been moved further downstream by fresh materials coming in through the injection ports 230 and 240. However, although not cured into solids, there are believed to be large numbers of nucleation sites created in the initial impingement mixing chamber 250. As the combined and partially mixed fluids move toward and into the static mixing elements 190, still under violent conditions, these particles have higher molecular weights and therefore greater momentum. The fluids containing these larger and growing particles have greater momentum as they work their way through the static mixing elements 190 than do particles of the prior art systems that typically enter static mixers without first having had the benefit of early polymerization. The static mixing becomes much more effective and therefore can become much more compact. This reduces the size and weight requirements of the spray gun 60 and enables the elimination of the solvent purging systems because the more compact spray gun 60 of the present invention has smaller mixing zones when compared to the typical conventional systems. These smaller mixing zones allow for solvent-free methods of effectively keeping the equipment operational. For comparison, the static mixing systems of the typical solvent flush systems include mixing zones that are more easily measured in feet (meters) rather than inches (cm) or fractions of inches (mm) as compared to the solvent-free plural component spraying system of the present invention 10.

A hand-held version of the preferred spray gun 60 of the present invention is reasonably compact and weighs less than 2.5 pounds (1.1 kg) due to the characteristics of the invention. This is important for many operations to minimize operator fatigue. In most cases, a larger or heavier gun would be less desirable and in some cases inoperable or unfit for a particular purpose.

The earlier discussion of densities may also have relevance with respect to these above dynamics although the materials tested in the present invention can be mixed thoroughly in this invention regardless of the percentage of high versus low density components or ingredients.

By being able to thus greatly decrease the size and/or length of the static mixing elements 190 to achieve suitable mixing, the applicants have become able to eliminate the use of solvent purging systems. There was also an air purging aspect in operation for these trials that cleared the impingement mixing chamber 250 of the impingement mixing element 140 of residual material at the end of each operation. It is not entirely clear from these experiments but it may be essential to have the air purge active. Alternatively, a means to drill further back into the chamber or some other means to keep the chamber clear might be required, if air is not used.

Articles of manufacture made from the solvent-free spraying system 10 of the present invention are varied and numerous. The most obvious application of the invention is for spray coating surfaces for corrosion protection and aesthetic reasons using urethane, epoxy, urea or one of the other types of plural component formulations available for such purposes. The spraying system 10 of the present invention has another unexpected and unintended benefit and advantage over most currently used systems. The elimination of the need for a mixing manifold upstream of the gun with its related solvent purging system allows for much shorter residency time for mixed material. Due to the ability of the present invention to spray mixed material through the spraying orifice 210 within about 4 inches (10 cm) from where the initial mixing takes place in the impingement mixing chamber 250 of the impingement mixing element 140, the cure rates of some or all of the various formulations can be greatly accelerated where the chemistry of the plural component formulation allows for accelerating the reactions through the use of certain catalysts, additional heating or other means. This is particularly interesting in the case of epoxy formulations that have gained widespread acceptance for use as protective coatings in recent years.

Articles of manufacture that can be produced by the spraying system 10 of the present invention also include various types of molded products such as roofing shingles and membranes, architectural moldings, structural and non-structural panels. The ability of the spraying system 10 to quickly build up thick materials, with or without the addition of blowing agents to foam the formulations has widespread application in a number of industries such as automobile manufacturing, infrastructure rehabilitation, construction, shipbuilding, etc.

Road lines are another example of an article that can be manufactured using the spraying system 10 of the present invention. Coating bridges, traffic bearing surfaces such as industrial floors, aircraft hangars, parking garages, etc. also take advantage of the ability of the present invention to be used with or without accelerated cure rates. For instance, in the case of making dashed road lines, since there is no need to use solvent to purge the system at the end of each operation, it is a relatively simple matter to adapt the spraying system 10 of the present invention to create a pattern of road lines of undetermined length in a highly efficient and waste-free manner. The need to stop and stop the spraying orifice for each dash in a road line has been tested in the above trials using the Roosen '490 formulation. A series of 100 start and stop operations over the course of a day were conducted before, during and after which there was no need to use any solvents whatsoever to clean any of the equipment used. Road lines that cure within seconds such as those produced from this invention are desirable and preferred over slower curing alternatives.

While the invention has been disclosed in its preferred form, the specific embodiments thereof as disclosed and illustrated herein are not to be considered in a limiting sense, because numerous variations are possible. The subject matter of the invention includes all novel and non-obvious combinations and subcombinations of the various elements, features, functions, and/or properties disclosed herein. No single feature, function, element, or property of the disclosed embodiments is essential. The following claims define certain combinations and subcombinations which are regarded as novel and non-obvious. Other combinations and subcombinations of features, functions, elements, and/or properties may be claimed through amendment of the present claims or presentation of new claims in this or a related application. Such claims also are regarded as included within the subject matter of the present invention irrespective of whether they are broader, narrower, or equal in scope to the original claims. This invention also covers all embodiments and all applications which will be immediately comprehensible to the expert upon reading this application, on the basis of his or her knowledge and optionally simple routine tests.

We claim:

1. A plural component spraying system comprising:
a set of ratio proportioning pumps for delivering two or more respective components of a plural component fluid formulation under pressure;
a heating system to heat said respective fluid components;
a mixing and dispensing apparatus into which said respective fluid components enter under pressure which includes an impingement mixing element, a backpressure element, a static mixer housing that contains one or more static mixing elements and an orifice portion from which mixed material is dispensed;
wherein
said impingement mixing element of said mixing and dispensing apparatus has entry ports and a mixing chamber configured such that said respective fluid components enter under pressure and initially mix by impingement mixing;
said orifice portion of said mixing and dispensing apparatus is located downstream of said static mixer housing;
said backpressure element is located between the respective fluid component entry ports of the impingement mixing element and said orifice portion;
the static mixer housing is easily and quickly removable to facilitate replacement of the static mixing element(s);
said system further comprising
temperature controllers for said fluid components;
a device for setting and maintaining a set ratio between said proportioning pumps.

2. The system as claimed in claim 1 in which the temperatures are in the range of 15 to 100 degrees C. and the temperature of the fluid components can be individually controlled.

3. The system as claimed in claim 1 in which the pressures are in the range of 1,700 to 70,000 kPa.

4. The system as claimed in claim 1 in which the static mixing element(s) is (are) made of a material that can be easily drilled out or in which the static mixing elements can be removed from the static mixer housings by using heat to melt, bake or burn them out, or force to push them out, and/or less than 1 liter of solvent can also be used to aid in the process of removing said elements.

5. The system as claimed in claim 1 in which the orifice portion is an injection or pouring orifice.

6. The system as claimed in claim 1 further comprising a gun housing which is slidable with respect to the static mixer housing into a dispensing position wherein connection block ports in the gun housing are in communication with the entry ports, and into a purging position wherein an air purge port in the gun housing is in communication with the entry ports, and the air purge is used to keep the impingement mixing chamber cleared of mixed material at the end of each operational cycle.

7. The system as claimed in claim 1 in which the spray gun weighs less than 1.5 kg.

8. The system as claimed in claim 1 in which the orifice portion is a spray nozzle.

9. A method of dispensing a plural component thermoplastic or thermosetting material, said method comprising
    delivering two or more respective components of a plural component fluid formulation to the plural component spraying system of claim 1;
    heating said respective fluid components;
    mixing said respective fluid components by impingement mixing in the impingement mixing chamber;
    further mixing said components in the static mixer housing that contains one or more static mixing elements; and
    dispensing mixed material with the orifice portion.

10. The method of claim 9, further comprising periodically removing the static mixer housing and replacing the static mixing element(s).

11. The method of claim 9, further comprising observing and adjusting the pressures developed by said set of ratio proportioning pumps.

12. The method of claim 9, further comprising setting and maintaining a set ratio between said proportioning pumps, and wherein the volumetric ratio of the respective fluid components is greater than 4:1.

13. The method of claim 9 further comprising adding a catalyst or catalysts to the fluid components to increase reaction rates and shorten curing times.

14. An article of manufacture made by the process of claim 9.

15. The method of claim 9, wherein the diameter of the entry port used for a lower viscosity fluid component is less than the diameter of the entry port used for a higher viscosity fluid component, such that the difference in pressure between the fluid components is not more than 7,000 kPa.

16. The system as claimed in claim 1 in which the backpressure element is between the impingement mixing element and the static mixer housing, and the backpressure element is an insert that fits into the impingement mixing element and is fastened into place by screwing the static mixer housing onto the end of the impingement mixing element.

17. The system as claimed in claim 1 in which the impingement mixer has a cylindrical mixing chamber and the backpressure element has a cylindrical port, the diameters of which are less than that of the static mixer housing.

18. The system as claimed in claim 1 in which the center lines of the impingement mixer entry ports are offset from each other and from the center line of the impingement mixing chamber, and one of the entry ports has a larger diameter than the other.

19. The system as claimed in claim 1 in which the static mixer housing has a long bore and a smaller bore, wherein the static mixer element(s) fits and resides in the long bore but not in the smaller bore, which smaller bore has a smaller diameter than the long bore.

\* \* \* \* \*